(12) United States Patent
Hao et al.

(10) Patent No.: US 12,483,456 B2
(45) Date of Patent: Nov. 25, 2025

(54) SATELLITE COMMUNICATION METHOD AND DEVICE BASED ON TIME DIVISION DUPLEX TDD FRAME STRUCTURE DESIGN

(71) Applicant: CHINA SATELLITE NETWORK INNOVATION CO., LTD, Beijing (CN)

(72) Inventors: Xuekun Hao, Beijing (CN); Xuetian Zhu, Beijing (CN); Lu Zhang, Beijing (CN); Zhicong Han, Beijing (CN); Yang Zhang, Beijing (CN)

(73) Assignee: CHINA SATELLITE NETWORK INNOVATION CO., LTD, Beijing (CN)

( * ) Notice: Subject to any disclaimer, the term of this patent is extended or adjusted under 35 U.S.C. 154(b) by 0 days.

(21) Appl. No.: 19/067,675

(22) Filed: Feb. 28, 2025

(65) Prior Publication Data

US 2025/0202754 A1    Jun. 19, 2025

Related U.S. Application Data

(63) Continuation of application No. PCT/CN2023/127316, filed on Oct. 27, 2023.

(51) Int. Cl.
*H04W 72/1263* (2023.01)
*H04L 27/26* (2006.01)
*H04W 72/0446* (2023.01)

(52) U.S. Cl.
CPC ..... *H04L 27/2656* (2013.01); *H04W 72/0446* (2013.01); *H04W 72/1263* (2013.01)

(58) Field of Classification Search
CPC .......... H04L 27/2656; H04W 72/0446; H04W 72/08; H04W 72/12; H04W 72/1263;
(Continued)

(56) References Cited

U.S. PATENT DOCUMENTS 10,498,435 B2 * 12/2019 Sridharan ............. H04L 5/1469
10,992,509 B2 *  4/2021 Zhao .................... H04W 56/001
(Continued)

FOREIGN PATENT DOCUMENTS

| CN | 109891968 A | 6/2019 |
|---|---|---|
| CN | 111315008 A | 6/2020 |
| CN | 111630908 A | 9/2020 |

OTHER PUBLICATIONS

International Search Report issued for counterpart Chinese Patent Application No. PCT/CN2023/127316 mailed on Jul. 12, 2024.
(Continued)

*Primary Examiner* — Siu M Lee
(74) *Attorney, Agent, or Firm* — LOZA & LOZA, LLP; Michael Fedrick

(57) ABSTRACT

The present disclosure provides a satellite communication method and apparatus based on a time division duplex (TDD) frame structure design. The solution is: determining a preset time division duplex (TDD) frame structure group corresponding to a base station, wherein the preset TDD frame structure group includes a first TDD frame structure and a second TDD frame structure generated after frame header offsetting is performed on the first TDD frame structure; in response to receiving a first message transmitted by a terminal, determining a UE set to which the terminal belongs, wherein the UE set is a first UE set or a second UE set; if the terminal belongs to the first UE set, scheduling the terminal based on the first TDD frame structure; and if the terminal belongs to the second UE set, scheduling the terminal based on the second TDD frame structure.

26 Claims, 8 Drawing Sheets

(58) Field of Classification Search
CPC ..... H04W 28/16; H04W 16/06; H04W 16/14; H04W 24/02
See application file for complete search history.

(56) References Cited

U.S. PATENT DOCUMENTS

| | | | |
|---|---|---|---|
| 11,979,842 B2* | 5/2024 | Palenius | H04L 5/14 |
| 2015/0333877 A1 | 11/2015 | Rahman et al. | |
| 2022/0330187 A1 | 10/2022 | Cheng et al. | |
| 2023/0156646 A1* | 5/2023 | Yao | H04W 56/0045 370/329 |
| 2025/0056592 A1* | 2/2025 | Hao | H04W 72/0453 |

OTHER PUBLICATIONS

3GPP (3rd Generation Partnership Project), "Discussion on supporting TDD duplex scheme for NTN," Technical Specification Group (TSG), Radio Access Networks (RAN) WG1 #99 R1-1912538, R1-99 Meeting, Reno, USA, Nov. 18-22, 2019.

First Office Action issued for corresponding Korean Patent Application No. 10-2025-7006949 mailed on Jun. 13, 2025, 6 pages.

* cited by examiner

Inner circle   Outer circle

SATELLITE COMMUNICATION METHOD AND DEVICE BASED ON TIME DIVISION DUPLEX TDD FRAME STRUCTURE DESIGN

CROSS-REFERENCE TO RELATED APPLICATIONS

This application is a continuation of International Application No. PCT/CN2023/127316, filed Oct. 27, 2023, which is hereby incorporated by reference in its entirety.

TECHNICAL FIELD

The present disclosure relates to the field of wireless communication, in particular relates to a satellite communication method and apparatus based on a time division duplex (TDD) frame structure design.

BACKGROUND

Currently, for a low earth orbit (denoted as LEO) satellite system, in systems already used in orbit, or in 3GPP international standards for 5G non-terrestrial networks (denoted as NTNs), satellite-ground user links consider to adopt an FDD (English full name being frequency division duplex) mode. However, taking into account scarcity of available spectrum resources in an FDD system (especially in a spectrum range less than 6 GHz), and uplink and downlink asymmetric services as main service types causes a low spectrum utilization rate in the FDD system. Currently, the industry is also actively exploring application of a TDD (English full name being time division duplexing) mode to satellite-ground user links.

In related technologies, in order to make full use of time domain resources under the TDD mode, different NTN cells corresponding to different satellite-borne base stations are configured to use GP (Guard Period) slots of different cells for data reception and transmission. However, this scheme has the following problem: improvement of a resource utilization rate is not enough by using this scheme, in each duration of a GP slot belonging to a cell, there is only one satellite-borne base station in the whole system that may communicate with some user equipments (denoted as UEs), the more ideal situation described below has not been achieved: in each duration of a GP slot belonging to a cell, each satellite-borne base station in the system may communicate with some UEs.

SUMMARY

A satellite communication method and apparatus based on a time division duplex (TDD) frame structure design proposed by the present disclosure is used to enable a satellite-borne base station to communicate with some other UEs when communication with some UEs enters into a waiting period (i.e., in a GP period of a corresponding frame structure); thereby, a utilization rate of air interface resources of a whole system is improved.

Embodiments of a first aspect of the present disclosure provide a satellite communication method based on a time division duplex (TDD) frame structure design, applicable to a network device, including: determining a preset time division duplex (TDD) frame structure group corresponding to a base station, wherein the preset TDD frame structure group includes a first TDD frame structure and a second TDD frame structure generated after frame header offsetting is performed on the first TDD frame structure; in response to receiving a first message transmitted by a terminal, determining a UE set to which the terminal belongs, wherein the UE set is a first UE set or a second UE set; if the terminal belongs to the first UE set, scheduling the terminal based on the first TDD frame structure; and if the terminal belongs to the second UE set, scheduling the terminal based on the second TDD frame structure.

According to the embodiments of the present disclosure, in a cell, based on classification and scheduling of UEs by a satellite-borne base station, some terrestrial UEs adopt the first TDD frame structure, while the TDD frame structure of other terrestrial UEs adopt a frame header offsetting version of the first TDD frame structure, i.e., the second TDD frame structure; and all (or part) of DL and UL slots in the second TDD frame structure correspond to GP slots in the first TDD frame structure (i.e. occurring at the same time), meanwhile, all (or part) DL and UL slots in the first TDD frame structure naturally correspond to GP slots in the second TDD frame structure, thereby enabling the satellite-borne base station to communicate with some other UEs when communication with some UEs enters into a waiting period (i.e., in a GP period of a corresponding frame structure); thereby, a utilization rate of air interface resources of a whole system is improved.

Embodiments of a second aspect of the present disclosure provide a satellite communication method based on a time division duplex (TDD) frame structure design, applicable to a user equipment (UE), including: transmitting a first message corresponding to a terminal to a base station; and receiving scheduling of the base station on the terminal based on a first TDD frame structure or a second TDD frame structure, wherein the second TDD frame structure is generated after the TDD frame structure performs frame header offsetting.

Embodiments of a third aspect of the present disclosure provide a satellite communication apparatus based on a time division duplex (TDD) frame structure design, applicable to a network device, the apparatus comprising: a determining module, configured to determine a preset time division duplex (TDD) frame structure group corresponding to a base station, wherein the preset TDD frame structure group includes a first TDD frame structure and a second TDD frame structure generated after frame header offsetting is performed on the first TDD frame structure; a determining module, configured to, in response to receiving a first message transmitted by a terminal, determine a UE set to which the terminal belongs, wherein the UE set is a first UE set or a second UE set; a first scheduling module, configured to, if the terminal belongs to the first UE set, schedule the terminal based on the first TDD frame structure; and a second scheduling module, configured to, if the terminal belongs to the second UE set, schedule the terminal based on the second TDD frame structure.

Embodiments of a fourth aspect of the present disclosure provide a satellite communication apparatus based on a time division duplex (TDD) frame structure design, applicable to a user equipment (UE), the apparatus comprising: a transmitting module, configured to transmit a first message corresponding to a terminal to a base station; and a reception scheduling module, configured to receive scheduling of the base station on the terminal based on a first TDD frame structure or a second TDD frame structure, wherein the second TDD frame structure is generated after the TDD frame structure performs frame header offsetting.

Embodiments of a fifth aspect of the present disclosure provide a communication device, comprising: at least one processor; and a memory in communication connection with the at least one processor; wherein the memory stores instructions that may be executed by the at least one processor, the instructions is executed by the at least one processor, so that the at least one processor is capable of executing a satellite communication method based on a time division duplex (TDD) frame structure design as described in the embodiments of the first aspect of the present disclosure, or a satellite communication method based on a time division duplex (TDD) frame structure design as described in the embodiments of the second aspect of the present disclosure.

Embodiments of a sixth aspect of the present disclosure provide a computer storage medium, wherein the computer storage medium stores a computer executable instruction that, after being executed by a processor, is capable of implementing a satellite communication method based on a time division duplex (TDD) frame structure design as described in the embodiments of the first aspect of the present disclosure, or a satellite communication method based on a time division duplex (TDD) frame structure design as described in the embodiments of the second aspect of the present disclosure.

DETAILED DESCRIPTION

Figure 1:
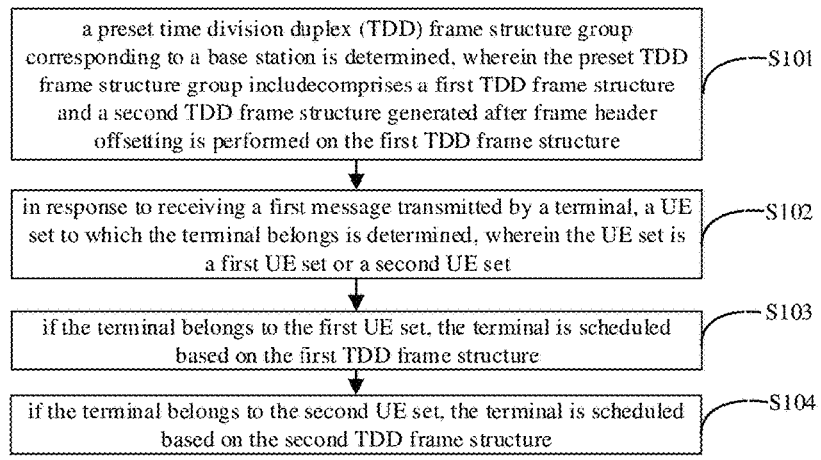
FIG. 1 is a schematic diagram of an exemplary implementation of a satellite communication method based on a time division duplex (TDD) frame structure design, as provided in the embodiments of the present disclosure.

Embodiments of the present disclosure are described in detail below, examples of the embodiments are shown in the drawings, in which identical or similar reference signs from beginning to end indicate identical or similar elements, or elements having identical or similar functions. The embodiments described below with reference to the drawings are exemplary and are intended to explain the present disclosure and cannot be understood as limitations on the present disclosure.

In relevant technologies, in order for a TDD system to work normally, a frame mode used, a GP (English full name being guard period) required for switching between a DL (English full name being downlink) slot and a UL (English full name being uplink) slot needs to be greater than or equal to "a round-trip time (denoted as $RTT_{radius}$) of signal propagation between a base station and a cell remote point". When a TDD mode is applied to a satellite-ground user link of a low orbit satellite, in view of a long signal propagation distance between a satellite and a user terminal (i.e., a user equipment, denoted as UE) on the ground, the order of magnitude of $RTT_{radius}$ is larger, thereby making a duration of the GP be very long, the long GP causes a utilization rate of an air interface resource of a whole system to be lower.

For example: for a low orbit satellite system, the order of magnitude of $RTT_{radius}$ is 5 milliseconds (denoted as ms). Generally, the GP may be set to be equal to $RTT_{radius}$; then, the GP is equal to 5 ms. If a subcarrier interval used is 30 kHz (that is, a duration of each slot is 0.5 ms), 10 special slots all being the GP are required between the DL slot and the UL slot (subsequently, we call the special slots that all are GP as "GP slots").

In some schemes, in order to make full use of time domain resources under the TDD mode, different NTN cells corresponding to different satellite-borne base stations are configured to use GP slots of different cells for data reception and transmission. However, this scheme has the following problems:
1. Improvement of a resource utilization rate is not enough by using this scheme, in each duration of a GP slot belonging to a cell, there is only one satellite-borne base station in the whole system that may communicate with some user equipments (denoted as UEs), the more ideal situation described below has not been achieved: in each duration of a GP slot belonging to a cell, each satellite-borne base station in the system may communicate with some UEs.
2. More importantly, when using this scheme, "a UE located at an edge of a cell, of the cell" and "a certain edge UE in an adjacent cell of this cell" may have a situation in which one is performing downlink reception while the other is performing uplink transmission; if a distance between these two edge UEs located in different cells is close, "UE-to-UE co-channel cross-link interference" is produced. If such interference may not be well avoided, this scheme is actually not feasible.
3. In addition, when using this scheme, because initial positions of system frames in different cells need to slip and then stagger, requirements for time synchronization between adjacent satellites are very strict.
4. Moreover, for a ratio among the number of DL slots, the number of UL slots and the number of GP slots, no universal and normative design is given, but just an example is given.

In order to solve the above technical problems, the embodiments of the present disclosure provide the following satellite communication method and apparatus based on a time division duplex (TDD) frame structure design.

FIG. 1 is a schematic diagram of an exemplary implementation of a satellite communication method based on a time division duplex (TDD) frame structure design, as shown in the present disclosure, applicable to a network device. As shown in FIG. 1, the satellite communication method based on a time division duplex (TDD) frame structure design includes the following steps:

$S_{101}$, a preset time division duplex (TDD) frame structure group corresponding to a base station is determined, wherein the preset TDD frame structure group includes a first TDD frame structure and a second TDD frame structure generated after frame header offsetting is performed on the first TDD frame structure.

In the present disclosure, the following three design modes for a preset TDD frame structure group are listed for selection.

Figure 2:
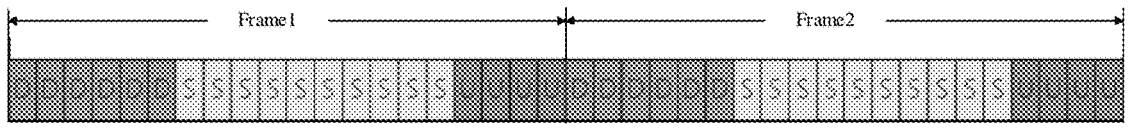
FIG. 2(a) is a schematic diagram of a first TDD frame structure in which the sum of the number of DL slots and UL slots is equal to the number N of GP slots, as shown in the present disclosure.
FIG. 2(b) is a schematic diagram of generating frame structure timing at a base station side by offsetting a frame header of the first TDD frame structure by N slots, as shown in the present disclosure.
Figure 2:
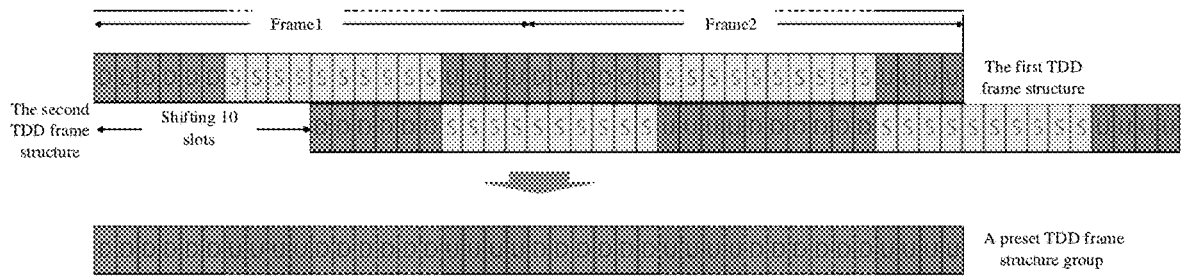

The first realizable frame structure design mode, a method for obtaining a preset TDD frame structure group, including: setting a first TDD frame structure, where the number of guard period (GP) slots of the first TDD frame structure is N (N is a positive integer), and the sum of the number of downlink (DL) slots and uplink (UL) slots of the first TDD frame structure is equal to N. FIG. 2(a) is a schematic diagram of a first TDD frame structure in which the sum of the number of DL slots and UL slots is equal to the number N of GP slots, as shown in the present disclosure. In the diagram, "D" denotes a downlink DL slot, "S" denotes a guard period GP slot, "U" denotes an uplink UL slot, N is 10. Based on FIG. 2(a), a frame header of the first TDD frame structure is offset by N slots to obtain a second TDD frame structure. FIG. 2(b) is a schematic diagram of generating frame structure timing at a base station side by offsetting a frame header of the first TDD frame structure by N slots, as shown in the present disclosure. As shown in FIG. 2(b), all DL slots and all UL slots in the second TDD frame structure correspond to all GP slots in the first TDD frame structure, a satellite-borne base station may simultaneously use the first TDD frame structure and the second TDD frame structure to respectively schedule some UEs; and after determining the first TDD frame structure and the second TDD frame structure, a preset TDD frame structure group is generated based on the first TDD frame structure and the second TDD frame structure.

In the first frame design implementation, the satellite-borne base station may always communicate with certain UEs, and there is no "Must Wait" period at all.

In the first frame structure design implementation, at a network side, conflicts in uplink and downlink directions does not occur in any slot, and interference is not be introduced additionally.

Figure 3:
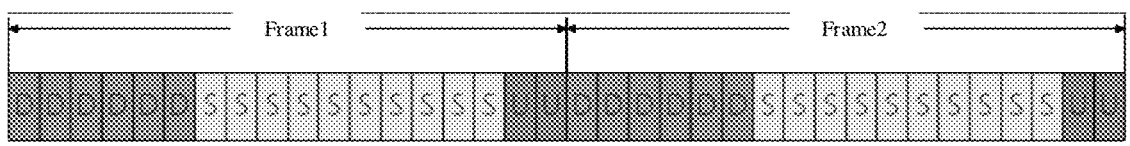
FIG. 3(a) is a schematic diagram of a first TDD frame structure in which the sum of the number of DL slots and UL slots is less than the number N of GP slots, as shown in the present disclosure.
FIG. 3(b) is a schematic diagram of generating frame structure timing at a base station side by performing frame header offsetting on the first TDD frame structure, as shown in the present disclosure.
Figure 3:
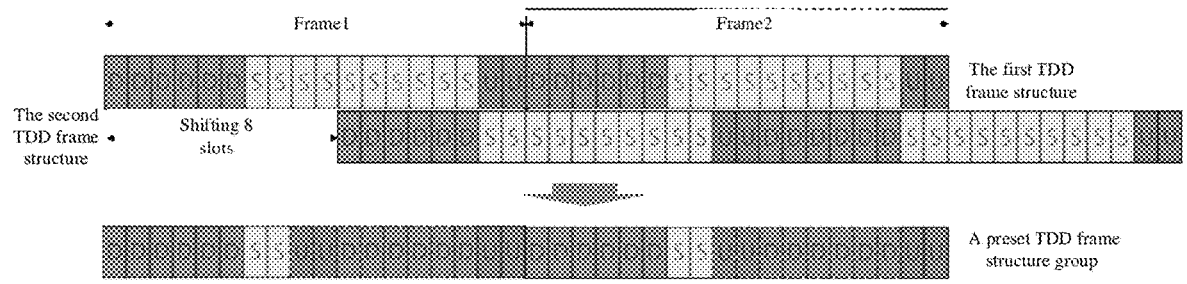

The second realizable frame structure design mode, a method for obtaining a preset TDD frame structure group, including: setting a first TDD frame structure, where the number of GP slots of the first TDD frame structure is N, and the sum of the number of DL slots and UL slots of the first TDD frame structure is less than N. FIG. 3(a) is a schematic diagram of a first TDD frame structure in which the sum of the number of DL slots and UL slots is less than the number N of GP slots, as shown in the present disclosure. In the diagram, "D" denotes a downlink DL slot, "S" denotes a guard period GP slot, "U" denotes an uplink UL slot, N is 10, the sum of the number of DL slots and UL slots is 8. Based on FIG. 3(a), frame header offsetting is performed on the first TDD frame structure to obtain a second TDD frame structure. FIG. 3(b) is a schematic diagram of generating frame structure timing at a base station side by performing frame header offsetting on the first TDD frame structure, as shown in the present disclosure. As shown in FIG. 3(b), all DL slots and all UL slots in the second TDD frame structure correspond to some GP slots in the first TDD frame structure, a satellite-borne base station may simultaneously use the first TDD frame structure and the second TDD frame structure to respectively schedule some UEs; and after determining the first TDD frame structure and the second TDD frame structure, a preset TDD frame structure group is generated based on the first TDD frame structure and the second TDD frame structure.

In the second frame design implementation, the satellite-borne base station is always not capable communicating with certain UEs, that is to say, a "Must Wait" period still exists. In terms of the example shown in FIG. 3(b), a period having two consecutive slots is still wasted.

In the second frame structure design implementation, at a network side, conflicts in uplink and downlink directions does not occur in any slot, and interference is not be introduced additionally.

Figure 4:
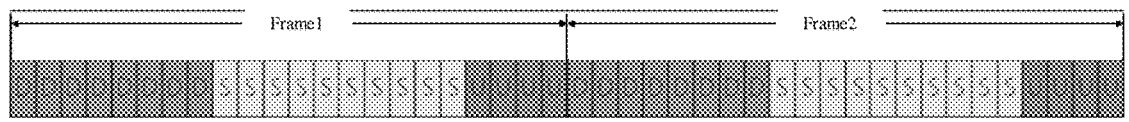
FIG. 4(a) is a schematic diagram of a first TDD frame structure in which the sum of the number of DL slots and UL slots is greater than the number N of GP slots, as shown in the present disclosure.
FIG. 4(b) is a schematic diagram of generating frame structure timing at a base station side by performing frame header offsetting on the first TDD frame structure, as shown in the present disclosure.
Figure 4:
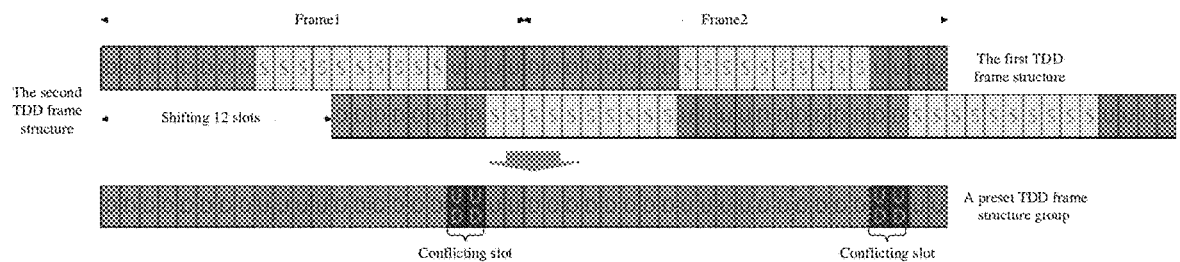

The third realizable frame structure design mode, a method for obtaining a preset TDD frame structure group, including: setting a first TDD frame structure, where the number of GP slots of the first TDD frame structure is N, and the sum of the number of DL slots and UL slots of the first TDD frame structure is greater than N. FIG. 4(a) is a schematic diagram of a first TDD frame structure in which the sum of the number of DL slots and UL slots is greater than the number N of GP slots, as shown in the present disclosure. In the diagram, "D" denotes a downlink DL slot, "S" denotes a guard period GP slot, "U" denotes an uplink UL slot, N is 10, the sum of the number of DL slots and UL slots is 12. Based on FIG. 4(a), frame header offsetting is performed on the first TDD frame structure to obtain a second TDD frame structure. FIG. 4(b) is a schematic diagram of generating frame structure timing at a base station side by performing frame header offsetting on the first TDD frame structure, as shown in the present disclosure. As shown in FIG. 4(b), some of all DL slots and all UL slots in the second TDD frame structure correspond to all GP slots in the first TDD frame structure, there is a conflicting slot between the first TDD frame structure and the second TDD frame structure, a satellite-borne base station may simultaneously use the first TDD frame structure and the second TDD frame structure to respectively schedule some UEs; a preset TDD frame structure group is generated based on the first TDD frame structure and the second TDD frame structure.

In the third frame structure design implementation, in terms of the example shown in FIG. 4(b), two DL slots in each frame period in the second TDD frame structure conflict with two UL slots in each frame period in the first TDD frame structure in uplink and downlink directions, and these two slots are regarded as conflicting slots.

In the third frame design implementation, the satellite-borne base station may always communicate with certain UEs, i.e., there is no "Must Wait" period.

S102, in response to receiving a first message transmitted by a terminal, a UE set to which the terminal belongs is determined, wherein the UE set is a first UE set or a second UE set.

The first UE set is a set consisting of terminals that are called to use the first TDD frame structure.

The second UE set is a set consisting of terminals that are called to use the second TDD frame structure.

Optionally, the first message is a message reported for the first time by a terminal for a position measurement result corresponding to the terminal after completing initial random access.

Optionally, the first message is a first message transmitted by a terminal to a base station when initiating initial random access.

If the base station receives the first message transmitted by the terminal, determining a UE set to which the terminal belongs according to a preset UE set determination criterion. A criterion for determining a UE set includes but is not limited to a terminal number equalization criterion or a dice throwing random criterion.

S103, if the terminal belongs to the first UE set, the terminal is scheduled based on the first TDD frame structure.

S104, if the terminal belongs to the second UE set, the terminal is scheduled based on the second TDD frame structure.

According to the embodiments of the present disclosure, in a cell, based on classification and scheduling of UEs by a satellite-borne base station, some terrestrial UEs adopt the first TDD frame structure, while the TDD frame structure of other terrestrial UEs adopt a frame header offsetting version of the first TDD frame structure, i.e., the second TDD frame structure; and all (or part) of DL and UL slots in the second TDD frame structure correspond to GP slots in the first TDD frame structure (i.e. occurring at the same time), meanwhile, all (or part) DL and UL slots in the first TDD frame structure naturally correspond to GP slots in the second TDD frame structure, thereby enabling the satellite-borne base station to communicate with some other UEs when communication with some UEs enters into a waiting period (i.e., in a GP period of a corresponding frame structure); thereby, a utilization rate of air interface resources of a whole system is improved.

Based on the above embodiments, if the preset TDD frame structure group adopts the third frame structure design implementation as shown in FIG. 4(b) in actual use, in order to avoid introduction of interference at a network side, we may adopt the following two modes:

1. The first realizable mode of avoiding introduction of interference at a network side, a conflicting slot on the first TDD frame structure may be selected to be set to silent; or, a conflicting slot on the second TDD frame structure is set to silent.

Based on this silence processing, the network side does not additionally introduce interference; and, a base station, as expected, does not have a "Must Wait" period. Some UEs thus lose a small amount of communication opportunities in a downlink (or uplink) direction, so a utilization rate of air interface resources of an overall system is improved, but is not best. By taking the specific frame structure shown in FIG. 4(b) as an example, a specific treatment may be: setting two DL slots among the conflicting slots in each frame period on the second TDD frame structure to be silent (that is, DL scheduling is not performed on any UE using the second TDD frame structure at that time, on these two slots). Because UEs that are scheduled to use the second TDD frame structure at this time sacrifice a small number of DL reception opportunities in each frame period, at the time of scheduling, according to the amount of downlink data of different users, UEs with a relatively smaller downlink data amount demand may be prioritized to use the second TDD frame structure.

Figure 5:
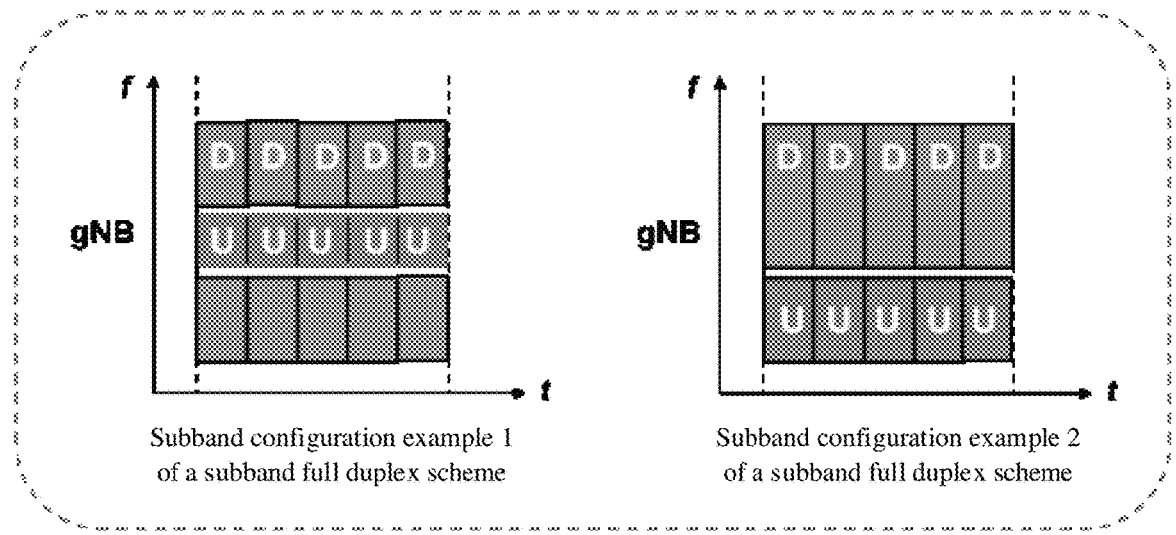
FIG. 5 is a schematic diagram of frequency division multiplexing with a subband as granularity by using a subband full duplex technology, as shown in the present disclosure.

2. The second realizable mode of avoiding introduction of interference at a network side, in order to avoid introduction of interference at the network side, when selecting that a conflicting slot is scheduled in a base station, frequency division multiplexing taking a subband as granularity is performed on reception of uplink data of a terminal which is scheduled by the base station and uses one frame structure in the first and second TDD frame structures, and transmission of downlink data of a terminal which is scheduled by the base station and uses the other frame structure in the first and second TDD frame structures, by using a subband full duplex technology. (Note: according to the definition of Rel-18, "subband full duplex" is only duplex operation enhancement performed at a base station side, and a terminal side maintains half duplex operation.) FIG. 5 is a schematic diagram of frequency division multiplexing with a subband as granularity by using a subband full duplex technology, as shown in the present disclosure.

By taking the specific frame structure shown in FIG. 4(b) as an example, for every two conflicting slots, at the time of scheduling, a satellite-borne base station performs frequency division multiplexing taking a subband as granularity on reception of uplink data of a terminal which is scheduled by the base station and uses the first TDD frame structure, and transmission of downlink data of a terminal which is scheduled by the base station and uses the second TDD frame structure, by using a subband full duplex technology.

After frequency division multiplexing taking a subband as granularity is performed on reception of uplink data of a terminal which is scheduled by the base station and uses one frame structure in the first and second TDD frame structures, and transmission of downlink data of a terminal which is scheduled by the base station and uses the other frame structure in the first and second TDD frame structures, by using a subband full duplex technology, at the base station side, residual inter-subband interference includes "gNB's self interference" and "gNB-to-gNB co-channel inter-subband cross-link interference". For these two kinds of interference, the interference avoidance scheme discussed for "subband full duplex" in Rel-18 is used to achieve good interference avoidance. A specific interference avoidance scheme may be: based on one or more schemes of an interference elimination scheme in a spatial domain (e.g. adding transceiver antenna separation and antenna isolation designs), an interference elimination scheme in an analog domain (e.g. adding an analog high rectangular coefficient filter to improve filtering performance) and an interference elimination scheme in a digital domain (e.g. signal processing for interference cancellation with the help of originating information, performing interference elimination for two kinds of inter-subband interferences residual on a network side, including gNB's self interference and gNB-to-gNB co-channel inter-subband cross-link interference.

UE-to-UE interference does not occur between any two UEs in UE sets using the same frame structure, regardless of using any of the above three realizable frame structure designs. The following is a more specific analysis on "UE-to-UE co-channel cross-link interference" that may exist between UEs using the first TDD frame structure and UEs using the second TDD frame structure.

Figure 6:
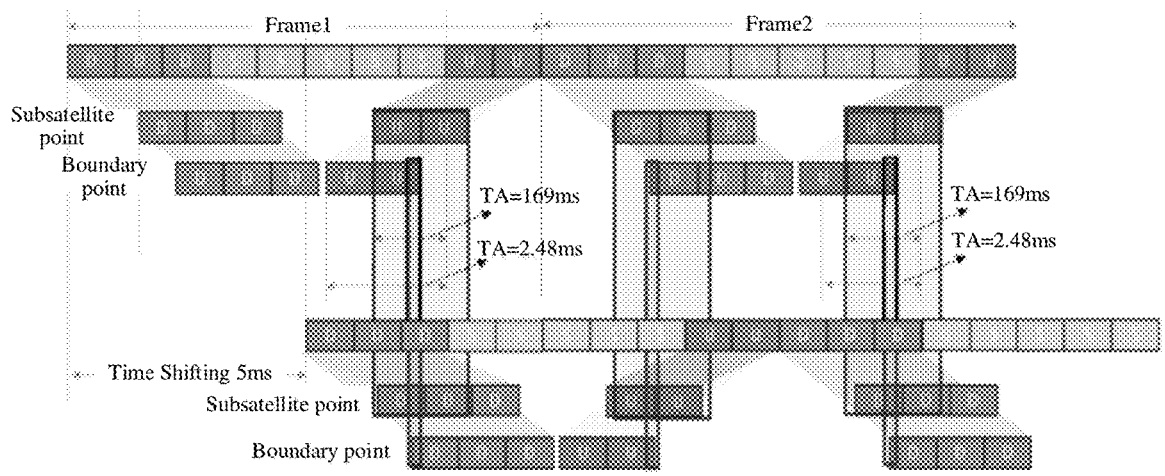
FIG. 6 is a schematic diagram of producing UE-to-UE co-channel cross-link interference, as shown in the present disclosure.

When the first frame structure design mode as exemplified in FIG. 2(b), the second frame structure design mode as exemplified in FIG. 3(b) are adopted, and when the third frame structure design mode as exemplified in FIG. 4(b) is adopted, and a silence processing scheme is adopted in a case where uplink and downlink conflicts occurs in some slots (conflicting slots) at a network side:

In case of being in a terrestrial network, there is no UE-to-UE co-channel cross-link interference between UEs using the first TDD frame structure and UEs using the second TDD frame structure in a cell. However, FIG. 6 is a schematic diagram of producing UE-to-UE co-channel cross-link interference, as shown in the present disclosure. As shown in FIG. 6, due to a too large propagation distance on a satellite-ground link, "a UE in a UE set using the first TDD frame structure (i.e., a first UE set)" and "a UE in a UE set using the second TDD frame structure (i.e., a second UE set)" may have a situation in which one UE is performing downlink reception, and the other UE is performing uplink transmission. If a distance between these two UEs is relatively close at this moment, UE-to-UE co-channel cross-link interference is generated.

2. When the third frame structure design mode as exemplified in FIG. 4(b) is adopted, and for a case where uplink and downlink conflicts occur in some slots (conflicting slots) at a network side, the second realizable mode of avoiding introduction of interference at a network side, such as a subband full duplex processing scheme, is adopted:

Regardless of being in a terrestrial network or for a LEO satellite network, UE-to-UE co-channel cross-link interference exists between UEs using the first TDD frame structure and UEs using the second TDD frame structure in a cell. At this moment, there are conflicts in uplink and downlink directions on a small number of slots at the network side, subband full duplex can be adopted to solve the conflicts.

For UE-to-UE co-channel cross-link interference that may possibly occur in a cell between "an UE in a UE set using the first TDD frame structure (i.e., the first UE set)" and "an UE in a UE set using the second TDD frame structure (i.e., the second UE set)", interference avoidance countermeasures are designed for two scenarios respectively: co-channel cross-link interference that may possibly exist between "UEs after initial random access is initiated", and co-channel cross-link interference that may possibly exist between "a UE that is initiating initial random access" and "a UE after initial random access is initiated" in a cell.

Figure 7:
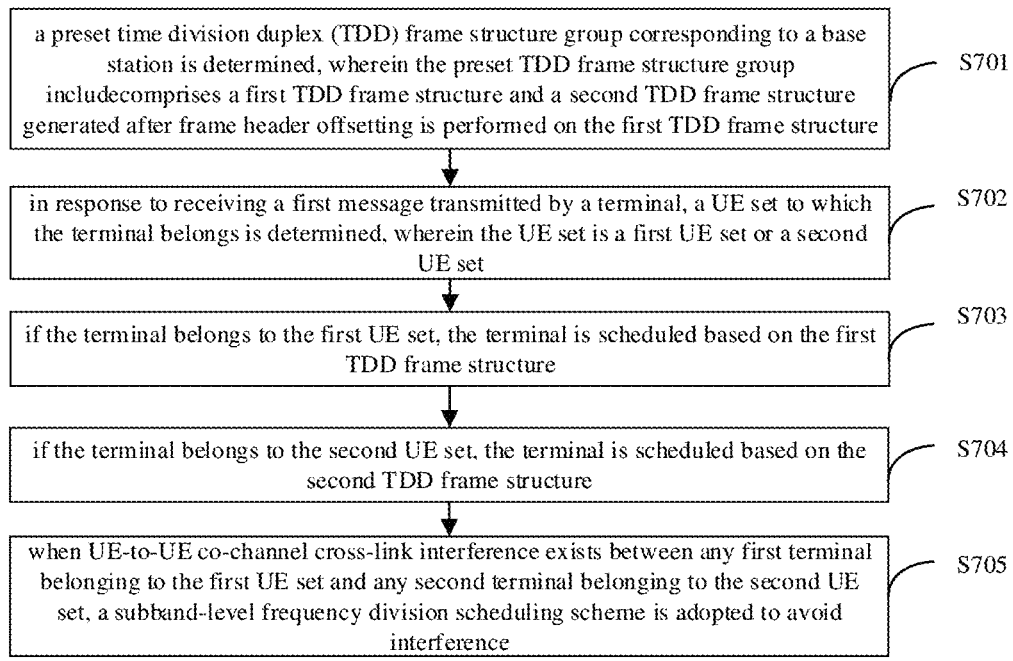
FIG. 7 is a schematic diagram of an exemplary implementation of a satellite communication method based on a time division duplex (TDD) frame structure design, as shown in the present disclosure.

FIG. 7 is a schematic diagram of an exemplary implementation of a satellite communication method based on a time division duplex (TDD) frame structure design, as shown in the present disclosure. This embodiment mainly introduces a method for avoiding co-channel cross-link interference that may possibly exist between "UEs after initial random access is initiated" based on a subband-level frequency division scheduling scheme. As shown in FIG. 7, the satellite communication method based on a time division duplex (TDD) frame structure design includes the following steps:

S701, a preset time division duplex (TDD) frame structure group corresponding to a base station is determined, wherein the preset TDD frame structure group includes a first TDD frame structure and a second TDD frame structure generated after frame header offsetting is performed on the first TDD frame structure.

S702, in response to receiving a first message transmitted by a terminal, a UE set to which the terminal belongs is determined, wherein the UE set is a first UE set or a second UE set.

S703, if the terminal belongs to the first UE set, the terminal is scheduled based on the first TDD frame structure.

S704, if the terminal belongs to the second UE set, the terminal is scheduled based on the second TDD frame structure.

Regarding specific implementations of the steps S701 to S704, refer to the specific introduction to the relevant parts of the steps S101 to S104 in the above embodiment, detailed description is not repeated here.

S705, when UE-to-UE co-channel cross-link interference exists between any first terminal belonging to the first UE set and any second terminal belonging to the second UE set, a subband-level frequency division scheduling scheme is adopted to avoid interference.

The following are two cases to introduce use of a subband-level frequency division scheduling scheme to avoid interference.

When the first frame structure design mode and the second frame structure design mode are adopted, and when the third frame structure design mode is adopted, and a silence processing scheme is adopted in a case where uplink and downlink conflicts occur in some slots at a network side:

There is no conflict in uplink and downlink directions at a network side, so although subband-level frequency division scheduling is carried out at this moment, at a base station, a transceiving operation at any moment is not equivalent to "subband full duplex", and at the base station side, there is no "gNB's self interference" and "gNB-to-gNB co-channel inter-subband cross-link interference".

Figure 8:
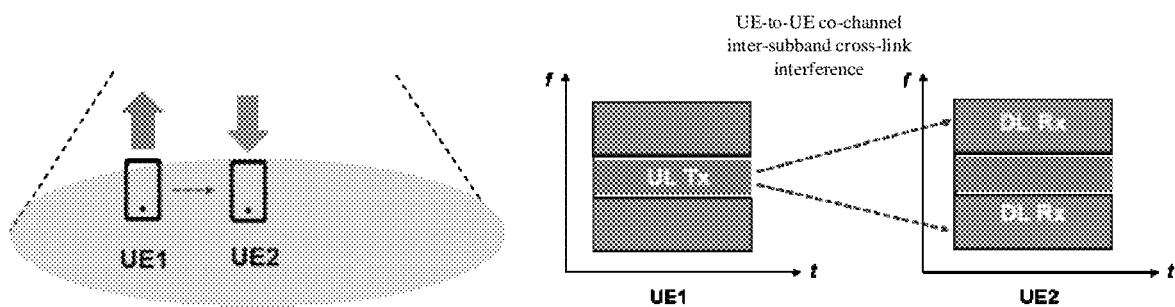
FIG. 8 is a schematic diagram of producing UE-to-UE co-channel cross-link interference, as shown in the present disclosure.

At a UE side, after subband-level frequency division isolation is performed, if there is residual UE-to-UE co-channel inter-subband cross-link interference between terminals, for the specific interference avoidance scheme, a scheme which may achieve good interference avoidance for "subband full duplex" in Rel-18, for example, is adopted, and may be one or more of an interference elimination scheme in a spatial domain (e.g. adding transceiver antenna separation and antenna isolation designs), an interference elimination scheme in an analog domain (e.g. adding an analog high rectangular coefficient filter to improve filtering performance) and an interference elimination scheme in a digital domain (e.g. signal processing for interference cancellation with the help of originating information), to perform interference elimination. FIG. 8 is a schematic diagram of producing UE-to-UE co-channel cross-link interference, as shown in the present disclosure.

2. When the third frame structure design mode is adopted, and for a case where uplink and downlink conflicts occur in some slots at a network side, when a subband full duplex processing scheme is adopted:

At this moment, in terms of a conflicting slot where uplink and downlink conflicts occur at a network side, because it per se adopts "subband full duplex", it has naturally achieved subband-level frequency division scheduling. For other slots, subband-level frequency division scheduling may be specially carried out. At a base station, a transceiving operation at any moment in these other slots is not equivalent to "subband full duplex".

At a UE side, after subband-level frequency division isolation is performed, if there is residual UE-to-UE co-channel inter-subband cross-link interference between terminals, for the specific interference avoidance scheme, a scheme which may achieve good interference avoidance for "subband full duplex" in Rel-18, for example, is adopted, and may be one or more of an interference elimination scheme in a spatial domain (e.g. adding transceiver antenna separation and antenna isolation designs), an interference elimination scheme in an analog domain (e.g. adding an analog high rectangular coefficient filter to improve filtering performance) and an interference elimination scheme in a digital domain (e.g. signal processing for interference cancellation with the help of originating information), to perform interference elimination.

Figure 9:
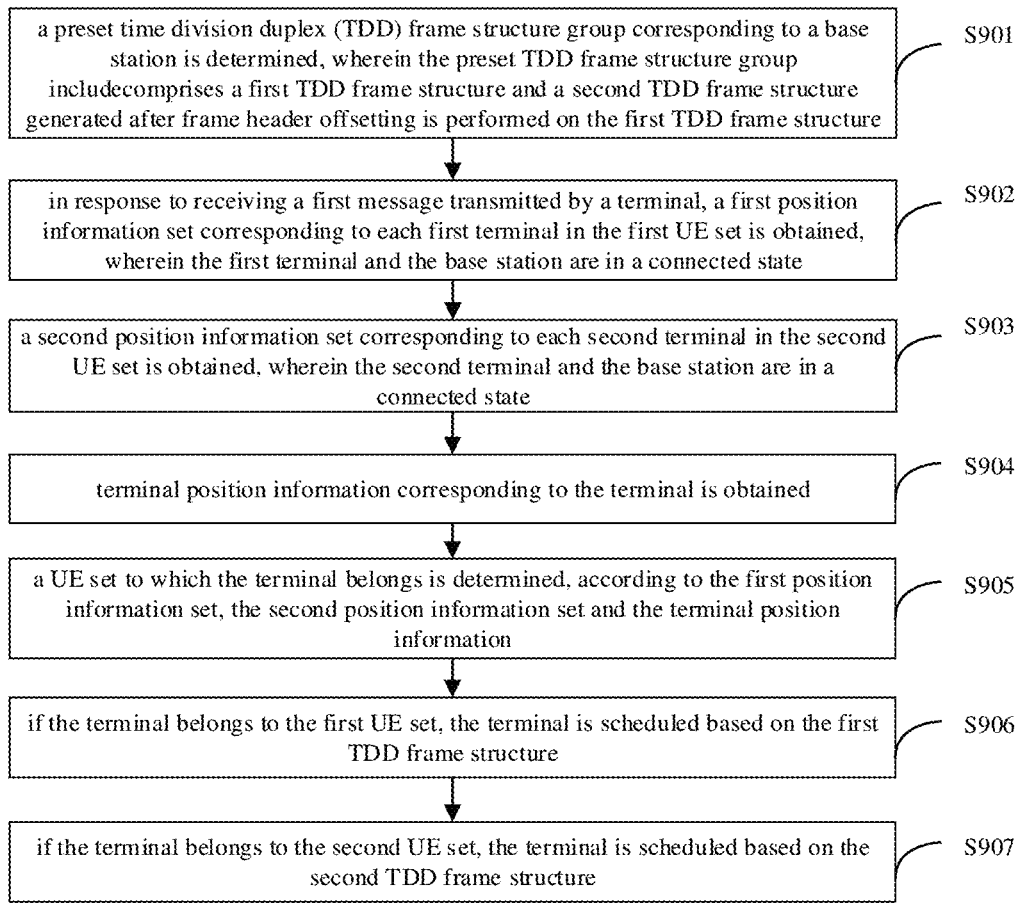
FIG. 9 is a schematic diagram of an exemplary implementation of a satellite communication method based on a time division duplex (TDD) frame structure design, as shown in the present disclosure.

FIG. 9 is a schematic diagram of an exemplary implementation of a satellite communication method based on a time division duplex (TDD) frame structure design, as shown in the present disclosure. This embodiment mainly introduces a method for avoiding co-channel cross-link interference that may possibly exist between "UEs after initial random access is initiated" based on geographical isolation. As shown in FIG. 9, the satellite communication method based on a time division duplex (TDD) frame structure design includes the following steps:

S901, a preset time division duplex (TDD) frame structure group corresponding to a base station is determined wherein the preset TDD frame structure group includes a first TDD frame structure and a second TDD frame structure generated after frame header offsetting is performed on the first TDD frame structure.

Regarding specific implementations of the step S901, there are three design schemes for a preset TDD frame structure group in total, refer to the specific introduction to the relevant parts of the step S101 in the above embodiment, detailed description is not repeated here.

S902, in response to receiving a first message transmitted by a terminal, a first position information set corresponding to each first terminal in the first UE set is obtained, wherein the first terminal and the base station are in a connected state.

The first UE set is a set consisting of terminals that are called to use the first TDD frame structure.

Each terminal in the first UE set serves as a first terminal. Position information of each first terminal is obtained as first position information, and a first position information set is generated based on all pieces of the first position information.

Optionally, the first terminal piggybacking-reports its own position information together in a reported traditional measurement report message, then a base station stores at least position information reported most recently by the first terminal, and when needed, the base station retrieves it from its own memory.

Optionally, the base station queries the position information of the first terminal explicitly and in real time via "Terminal Information Request Message".

Optionally, the first terminal may specially report its own position information periodically, or based on an event-triggered mode (e.g.: finding that a distance caused by its own position change exceeds a threshold), then a base station stores at least position information reported most recently by the first terminal, and when needed, the base station retrieves it from its own memory.

S903, a second position information set corresponding to each second terminal in the second UE set is obtained, wherein the second terminal and the base station are in a connected state.

The second UE set is a set consisting of terminals that are called to use the second TDD frame structure.

Each terminal in the second UE set serves as a second terminal. Position information of each second terminal is obtained as second position information, and a second position information set is generated based on all pieces of the second position information.

S904, terminal position information corresponding to the terminal is obtained.

Terminal position information corresponding to a terminal that transmits the first message is obtained, that is, terminal position information corresponding to a terminal that is to be determined by a base station to be called based on the first TDD frame structure or the second TDD frame structure.

S905, a UE set to which the terminal belongs is determined, according to the first position information set, the second position information set and the terminal position information.

In a LEO satellite system, each UE reports its own geographical position information obtained through GNSS (e.g. Beidou System) to a satellite-borne base station.

The area covered by cells of each LEO satellite system on the ground is quite vast (its order of magnitudes is hundreds of thousands or even millions of square kilometers). Therefore, there is large enough geographical space in each cell, so that a distance between two UEs in the cell may be large enough to well avoid mutual interference between UEs.

It is not difficult to understand that a base station uses two kinds of frame structures to respectively schedule some UEs in the cell, which is equivalent to dividing the UEs in the corresponding cell into two user sets.

Thus, in order to avoid "UE-to-UE co-channel cross-link interference" in the cell, it may be considered to make the base station, when scheduling, try to make a geographical distance between "any UE in a UE set using the first TDD frame structure" and "any UE in a UE set using the second TDD frame structure" be greater than a first preset distance threshold.

Specifically, for any UE after initial random access is initiated, when the base station decides the UE adopts the first TDD frame structure or the second TDD frame structure, first, a minimum distance in distances between the terminal and each first terminal in the first UE set to serve as a first distance is obtained according to the first position information set and the terminal position information.

A minimum distance in distances between the terminal and each second terminal in the second UE set to serve as a second distance is obtained according to the second position information set and the terminal position information.

The first distance and the second distance are compared with a first preset distance threshold to determine a UE set to which the terminal belongs. Several situations that are determined to possibly occur are shown below:

If both the first distance and the second distance are greater than or equal to the first preset distance threshold, the base station lets the UE adopt the first TDD frame structure or the second TDD frame structure, that is, at this moment, interference between UEs may be avoided only using geographical isolation. In this way, it may be determined that the terminal belongs to the first UE set or it may be determined that the terminal belongs to the second UE set.

If the first distance is greater than or equal to the first preset distance threshold and the second distance is less than the first preset distance threshold, it is determined that the terminal belongs to the first UE set, that is, interference between UEs may be avoided only using geographical isolation.

If the first distance is less than the first preset distance threshold and the second distance is greater than or equal to the first preset distance threshold, it is determined that the terminal belongs to the second UE set, that is, interference between UEs may be avoided only using geographical isolation.

If both the first distance and the second distance are less than the first preset distance threshold, that is, at this moment, interference between UE is not capable being avoided only using geographical isolation, a UE set to which the terminal belongs is determined based on a preset UE set determination criterion. That a UE set to which the terminal belongs is determined based on a preset UE set determination criterion includes but is not limited to: determining a UE set to which the terminal belongs based on terminal quantity balance criteria within the first UE set and the second UE set; or, determining a UE set to which the terminal belongs based on a randomly selected one of criteria.

S906, if the terminal belongs to the first UE set, the terminal is scheduled based on the first TDD frame structure.

S907, if the terminal belongs to the second UE set, the terminal is scheduled based on the second TDD frame structure.

According to the embodiments of the present disclosure, in a cell, based on classification and scheduling of UEs by a satellite-borne base station, some terrestrial UEs adopt the first TDD frame structure, while the TDD frame structure of other terrestrial UEs adopt a frame header offsetting version of the first TDD frame structure, i.e., the second TDD frame structure; and all (or part) of DL and UL slots in the second TDD frame structure correspond to GP slots in the first TDD frame structure (i.e. occurring at the same time), meanwhile, all (or part) DL and UL slots in the first TDD frame structure naturally correspond to GP slots in the second TDD frame structure, thereby enabling the satellite-borne base station to communicate with some other UEs when communication with some UEs enters into a waiting period (i.e., in a GP period of a corresponding frame structure); thereby, a utilization rate of air interface resources of a whole system is improved.

Further, if both the first distance and the second distance are less than the first preset distance threshold, after determining a UE set to which the terminal belongs based on a preset UE set determination criterion, the method further comprising:

if the UE set to which the terminal belongs is a second UE set, according to the first position information set and the terminal position information, obtaining a first terminal subset in the first UE set whose distance value from the terminal is less than the first preset distance threshold, and adopting a subband-level frequency division scheduling scheme to avoid co-channel cross-link interference between the terminal and each terminal in the first terminal subset; and, if the UE set to which the terminal belongs is a first UE set, according to the second position information set and the terminal position information, obtaining a second terminal subset in the second UE set whose distance value from the terminal is less than the first preset distance threshold, and adopting a subband-level frequency division scheduling scheme to avoid co-channel cross-link interference between the terminal and each terminal in the second terminal subset.

Further, UEs have mobility, so a geographical distance between UEs may possibly change. If position update information reported by any of the first terminals in the first UE set or any of the second terminals in the second UE set is received, according to the position update information, a UE set corresponding to terminals reporting the position update information is redetermined based on the above step S902 to S905.

In addition, a further optimization process may also be considered: that is, according to a change of a distance between UEs, a base station may switch a frame structure used by a UE between the first TDD frame structure and the second TDD frame structure at right timing; thereby try to avoid interference between UEs only by using geographical isolation.

When redetermining a UE set corresponding to terminals reporting the position update information according to the position update information, a UE set to which at least one terminal that does not report the position update information in the first UE set and the second UE set belongs is changed, so that the number of terminals that need to adopt a subband-level frequency division scheduling scheme to avoid UE-to-UE co-channel cross-link interference, in the updated first and second UE sets, may be minimized.

It should be noted that when the first frame structure design mode and the second frame structure design mode are adopted, and when the third frame structure design mode is adopted, and a silence processing scheme is adopted in a case where uplink and downlink conflicts occur in some slots at a network side, even if two UEs using different frame structures meet a situation in which "one is performing downlink reception and the other one is performing uplink transmission", only when the two UEs are close to each other, "UE-to-UE co-channel cross-link interference" occurs. Therefore, when the first frame structure design mode and the second frame structure design mode are adopted, and when the third frame structure design mode is adopted, and a silence processing scheme is adopted in a case where uplink and downlink conflicts occur in some slots at a network side, a geographical isolation method described in this embodiment may be adopted to avoid "UE-to-UE co-channel cross-link interference".

It should be noted that when the third frame structure design mode is adopted, and a subband full-duplex processing scheme is adopted in a case where uplink and downlink conflicts occur in some slots at a network side, at this moment, it has decided to adopt subband full-duplex processing on scheduling of a small number of slots, so at moments corresponding to certain slots, "UE-to-UE co-channel inter-subband cross-link interference" exists between UEs using different frame structures, regardless of a geographical distance between them. Therefore, if this specific frame structure design is adopted, it is neither suitable nor recommended to adopt the geographical isolation method described in this embodiment to avoid "UE-to-UE co-channel cross-link interference". The subband-level based frequency division scheduling scheme in the above embodiments is adopted to avoid "UE-to-UE co-channel cross-link interference".

The following text introduces three realizable methods for avoiding co-channel cross-link interference that may possibly exist between "a UE that is initiating initial random access" and "a UE after initiating initial random access" in a cell.

A main reason why this interference may possibly occur is: for any idle UE, before it initiates initial random access to a satellite-borne base station, usually the base station neither knows its geographical position information, nor knows which of the two frame structures it adopts to transmit a first random access message (i.e. Msg1 or MsgA) including a PRACH preamble sequence (i.e., Physical Random Access Channel preamble sequence). Therefore, for UE-to-UE co-channel cross-link interference caused by the first random access message of "the UE that is initiating initial random access" to "the UE after initiating initial random access", an avoidance strategy needs to be designed specifically.

First Scheme:

If the first message is a message reported by a terminal for the first time for a corresponding position measurement result of the terminal after completing initial random access, at this moment, TDD frame structure configuration information carried by the base station in a broadcast first system message is configuration information corresponding to the first TDD frame structure, and after the base station receives a first message of all messages transmitted by the terminal before transmitting the first message, if the terminal at a current moment is not included in the first UE set or the second UE set, determining that the terminal belongs to the first UE set; wherein a moment for reporting a message reported for the first time for a position measurement result corresponding to the terminal is after the terminal completes initial random access, completes identity identification, authentication and encryption with a core network via a non-access stratum (NAS), and completes a safe mode control flow with the base station via air interface interaction.

If the first message is a first message transmitted by the terminal to the base station when initiating initial random access, at this moment, first reporting of the position measurement result corresponding to the terminal adopts a pre-configured time-frequency resource in a system message and is transmitted to the base station along with the first message; TDD frame structure configuration information carried by the base station in a broadcast first system message is configuration information corresponding to the first TDD frame structure, and the terminal transmits the first message using a timing sequence of the first TDD frame structure.

Regardless of the first message being any one of the above two types, in the present disclosure, when the base station performs time-frequency resource scheduling of a downlink for any terminal belonging to the second UE set, determining a slot index of a UL slot configured to transmit a random access preamble sequence, in the first TDD frame structure; obtaining a slot index of multiple consecutive DL slots distancing the UL slot configured to transmit a random access preamble sequence in the first TDD frame structure by a preset slot range, in the second TDD frame structure; and when performing frequency-domain resource scheduling on each DL slot of multiple consecutive DL slots within the preset slot range in the second TDD frame structure, realizing subband-level frequency division scheduling with an air interface resource for performing initial random access configured to terminals in the first UE set. Specifically, each idle UE selects the timing sequence of the first TDD frame structure to initiate initial random access (i.e., adopting the timing sequence of the first TDD frame structure to transmit Msg1 of the 4-step random access or MsgA of the 2-step random access). Meanwhile, when the base station performs DL scheduling of UE(s) in "a UE set using the second TDD frame structure", for consecutive DL slots closest to "a UL slot that transmits a random access preamble sequence in the first TDD frame structure" in the second TDD frame structure, a subband is taken as the minimum granularity in a frequency domain to avoid frequency domain resources corresponding to PRACH occasions. If an idle UE initiates initial random access, and "UE(s) using the second TDD frame structure" is/are performing DL reception at the same time in a position distancing from the UE by being less than the geographical isolation threshold, for residual inter-subband interference at these "UEs using the second TDD frame structure", an organic combination of interference elimination schemes in airspace domain/analog domain/digital domain as discussed in Rel-18 is adopted to compete.

Theoretically, even if each idle UE selects to adopt the timing sequence of the first TDD frame structure to initiate the initial random access, a UE in a connected state does not have to adopt the timing sequence of the first TDD frame structure to initiate the initial random access (for the connected state, there are also some situations that need to initiate the initial random access, such as over-zone switching, etc.). A more reasonable approach is to adopt a timing sequence of a frame structure currently in use to initiate the initial random access (then, it is possible to initiate the initial random access adopting a timing sequence of the second TDD frame structure). Therefore, on the second TDD frame structure, it is also necessary to broadcast PRACH occasion configurations. Although, theoretically, PRACH occasions broadcast on the first TDD frame structure and the second TDD frame structure may be set to be different configurations, a simpler and more efficient approach is: PRACH occasions broadcast on the first TDD frame structure and the second TDD frame structure should be set to be exactly the same configuration. So, based on the assumption of "setting to be exactly the same configuration", in the above description, when PRACH occasions are mentioned, no distinction is made between a PRACH occasion configured for "a UE set using the first TDD frame structure" and a PRACH occasion configured for "a UE set using the second TDD frame structure".

Because a PRACH transmission cycle of many PRACH formats is 1 frame (i.e., each wireless frame has a PRACH occasion in a period of a UL slot), for the above "for consecutive DL slots closest to "a UL slot that transmits a random access preamble sequence in the first TDD frame structure" in the second TDD frame structure, a subband is taken as the minimum granularity in a frequency domain to avoid frequency domain resources corresponding to PRACH occasions", it is equivalent to performing subband-level frequency domain isolation of PRACH occasions for each set of consecutive DL slots in the first TDD frame structure.

In this scheme, a terminal that is in an idle state and has not initiated initial random access to the base station belongs neither to the first UE set nor to the second UE set.

Second Scheme:

In the present disclosure, if the first message is a first message transmitted by the terminal to the base station when initiating initial random access, at this moment, first reporting of the position measurement result corresponding to the terminal adopts a pre-configured time-frequency resource in a system message and is transmitted to the base station along with the first message; TDD frame structure configuration information carried by the base station in a broadcast first system message is configuration information corresponding to the first TDD frame structure.

At this moment, as a realizable mode, the method for determining whether the first message is transmitted and a frame structure corresponding to the first message when being transmitted includes:

TDD frame structure configuration information carried by the base station in a broadcast first system message is configuration information corresponding to the first TDD frame structure;

a second system message broadcast by the base station carries position information of a terminal that has belonged to the second UE set in a current beam footprint covered by a beam carrying the second system message, and position information of a terminal that has belonged to the second UE set and whose nearest distance from a boundary of the current beam footprint in each adjacent beam footprint is less than or equal to a first preset distance threshold, wherein the first system message and the second system message are used by the terminal to determine whether current initiation of initial random access produces UE-to-UE co-channel cross-link interference to a neighboring terminal that has belonged to the second UE set, based on the first system message and the second system message broadcast by the base station, a position measurement result of the terminal itself, and the first preset distance threshold, wherein if a determination result is that UE-to-UE interference is not produced to a neighboring terminal in the second UE set, the terminal transmits the first message using a timing sequence of the first TDD frame structure;

wherein if a determination result is that UE-to-UE interference is produced to at least one neighboring terminal in the second UE set, the terminal does not transmit the first message temporarily, wherein if the first message is transmitted, first reporting of the position measurement result corresponding to the terminal adopts a pre-configured time-frequency resource in a system message and is transmitted to the base station along with the first message.

At this moment, as another realizable mode, the method for determining whether the first message is transmitted and a frame structure corresponding to the first message when being transmitted includes:

TDD frame structure configuration information carried by a first system message broadcast by the base station includes configuration information corresponding to the first TDD frame structure and configuration information of frame header offsetting required to generate the second TDD frame structure;

a second system message broadcast by the base station carries position information of a terminal that has belonged to the first UE set and the second UE set in a current beam footprint covered by a beam carrying the second system message, and position information of a terminal that has belonged to the first UE set and the second UE set and whose nearest distance from a boundary of the current beam footprint in each adjacent beam footprint is less than or equal to a first preset distance threshold, wherein the first system message and the second system message are used by the terminal to determine whether current initiation of initial random access produces UE-to-UE co-channel cross-link interference to a neighboring terminal that has belonged to the first UE set or the second UE set, based on the first system message and the second system message broadcast by the base station, a position measurement result of the terminal itself, and the first preset distance threshold, wherein if a determination result is that UE-to-UE interference is not produced to neighboring terminals in the first UE set and the second UE set, the terminal transmits the first message using a timing sequence of the first TDD frame structure or the second TDD frame structure, wherein if a determination result is that UE-to-UE interference is produced to a neighboring terminal in the first UE set but is not produced to a neighboring terminal in the second UE set, the terminal transmits the first message using a timing sequence of the first TDD frame structure, wherein if a determination result is that UE-to-UE interference is produced to a neighboring terminal in the second UE set but is not produced to a neighboring terminal in the first UE set, the terminal transmits the first message using a timing sequence of the second TDD frame structure, wherein if a determination result is that UE-to-UE interference is produced to at least one neighboring terminal in the first UE set and at least one neighboring terminal in the second UE set, the terminal does not transmit the first message temporarily, and wherein if the first message is transmitted, first reporting of the position measurement result corresponding to the terminal adopts a pre-configured time-frequency resource in a system message and is transmitted to the base station along with the first message.

In actual implementation, for a terminal geographical position information that needs to be broadcast by a base station, before broadcasting, it may be compressed from different angles and/or in different ways to reduce the amount of data. For example: coordinates of each dimension in three-dimensional geographic coordinates are lowered appropriately to represent the number of bytes of information, or here, two-dimensional rather than three-dimensional geographic coordinates are adopted, and a certain appropriate information compression algorithm is specifically considered to be adopted.

In this scheme, a terminal that is in an idle state and has not initiated initial random access to the base station belongs neither to the first UE set nor to the second UE set.

Third Scheme:

If the first message is a message reported for the first time by a terminal for a position measurement result corresponding to the terminal after completing initial random access, at this moment, TDD frame structure configuration information carried by a base station in a broadcast first system message is configuration information corresponding to the first TDD frame structure, before the first message is transmitted, the terminal performs message transceiving based on the timing sequence defined by the first TDD frame structure.

If the first message is a first message transmitted by the terminal to the base station when initiating initial random access, at this moment, first reporting of the position measurement result corresponding to the terminal adopts a pre-configured time-frequency resource in a system message and is transmitted to the base station along with the first message; TDD frame structure configuration information carried by the base station in a broadcast first system message is configuration information corresponding to the first TDD frame structure.

No matter the first message is any one of the above two, in the present disclosure, any historical terminal that has ever accessed to the base station and entered a connected state, after it becomes idle, as long as the base station finds that the terminal is still in a beam footprint that is covered by the base station according to position information of a terrestrial beam footprint currently covered by the base station itself and position information of the terminal stored on a base station side, the terminal belongs to the first UE set.

Any historical terminal that has ever completed registration in a LEO satellite communication system to which the base station belongs and has not been deregistered, a core network transmits an identifier and historical position information of the terminal to a satellite-borne base station covering the terminal according to the stored historical position information of the terminal, the satellite-borne base station covering the terminal belongs the terminal to the first UE set.

When the base station schedules a terminal upon initiation of initial random access, if it is found that the terminal belongs to in the second UE set according to the UE set determination criterion, a fifth distance between the terminal and each idle-state historical terminal that belongs to the first UE set is obtained.

If any fifth distance is greater than or equal to the first preset distance threshold, the terminal is converted to belong to the first UE set and is scheduled based on the first TDD frame structure.

Further, the base station needs to receive a corresponding position measurement result of the terminal reported by the terminal to the base station before random access to the base station; wherein before the terminal initiates random access to any satellite-borne base station, if the terminal may access a terrestrial network, the terminal automatically transmits a current position measurement result to a wireless access node that may be accessed by it in the terrestrial network, then the wireless access node forwards the result to a satellite-ground cooperative network element that may performs information interaction with a satellite in the terrestrial network, then based on the satellite-ground cooperative network element, the current position measurement result of the terminal is transmitted to a current satellite-borne base station that may cover the terminal.

Similar to interference situations in a cell, between cells, UE-to-UE interference does not occur between any two UEs in UE sets using the same frame structure, regardless of adopting which one of specific frame structure designs mentioned above.

However, "a cell edge UE in a UE set using the first TDD frame structure" and "an edge UE in a UE set using the second TDD frame structure in an adjacent cell" may possibly have a situation in which one is performing downlink reception, and the other one is performing uplink transmission. If a distance between these two edge UEs located in different cells is relatively close, UE-to-UE co-channel cross-link interference is generated.

Figure 10:
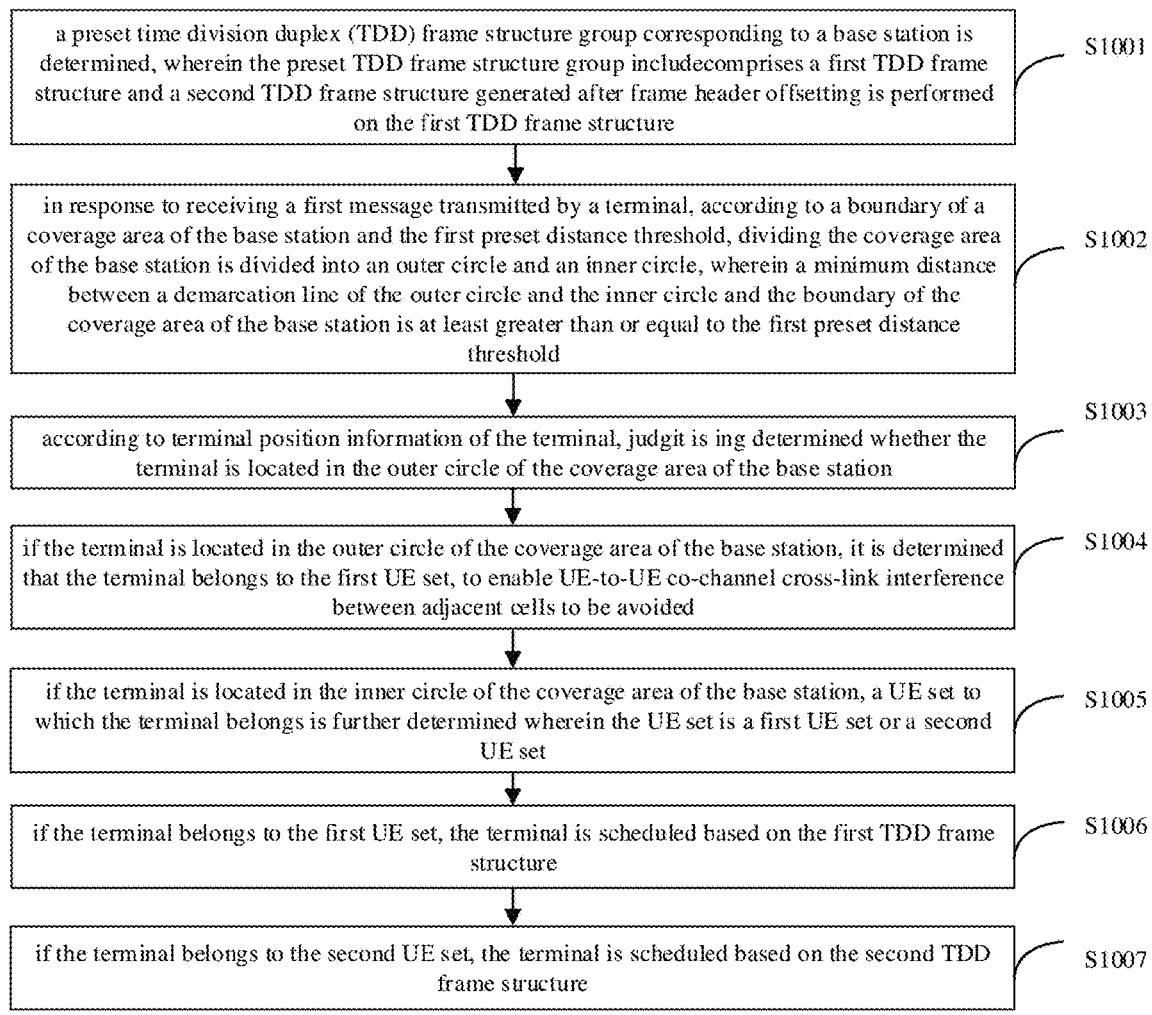
FIG. 10 is a schematic diagram of an exemplary implementation of a satellite communication method based on a time division duplex (TDD) frame structure design, as shown in the present disclosure.

FIG. 10 is a schematic diagram of an exemplary implementation of a satellite communication method based on a time division duplex (TDD) frame structure design, as shown in the present disclosure. This embodiment mainly introduces a method for performing UE-to-UE co-channel cross-link interference avoidance for "a cell edge UE in a UE set using the first TDD frame structure" and "an edge UE in a UE set using the second TDD frame structure in an adjacent cell" based on geographical area fence. As shown in FIG. 10, the satellite communication method based on a time division duplex (TDD) frame structure design includes the following steps:

S1001, a preset time division duplex (TDD) frame structure group corresponding to a base station is determined, wherein the preset TDD frame structure group includes a first TDD frame structure and a second TDD frame structure generated after frame header offsetting is performed on the first TDD frame structure.

Regarding specific implementations of the step S1001, there are three design schemes for a preset TDD frame structure group in total, refer to the specific introduction to the relevant parts of the step S101 in the above embodiment, detailed description is not repeated here.

S1002, in response to receiving a first message transmitted by a terminal, according to a boundary of a coverage area of the base station and the first preset distance threshold, the coverage area of the base station is divided into an outer circle and an inner circle, wherein a minimum distance between a demarcation line of the outer circle and the inner circle and the boundary of the coverage area of the base station is at least greater than or equal to the first preset distance threshold.

Figure 11:
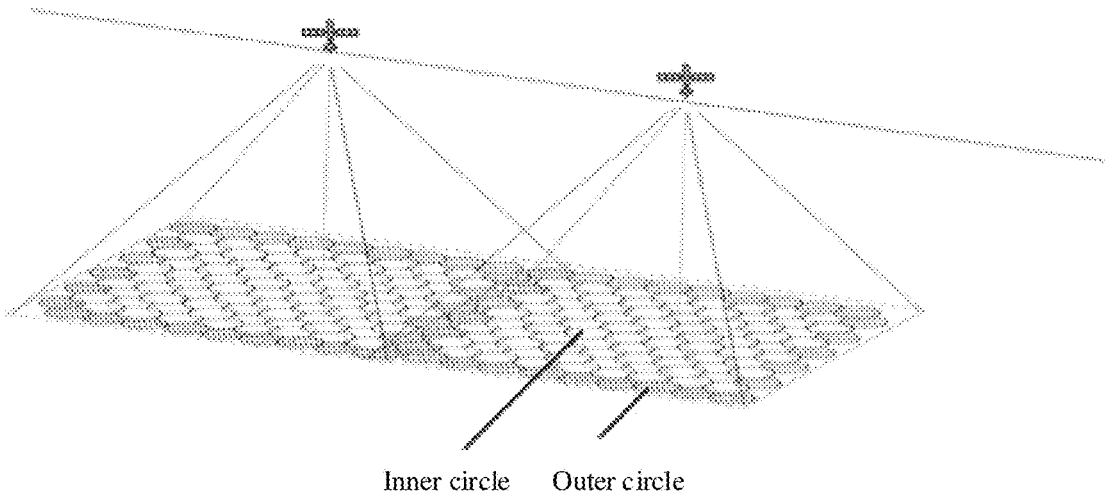
FIG. 11 is a schematic diagram of dividing a coverage area of a base station into an outer circle and an inner circle, as shown in the present disclosure.

By taking a subsatellite point as the center, according to a distance from the subsatellite point, the coverage area of the cell is logically divided into two inner and outer circles; wherein the outer circle corresponds to a distance going inward from a boundary line of the coverage area of the cell, whose numerical value is equal to a first preset distance threshold. FIG. 11 is a schematic diagram of dividing a coverage area of a base station into an outer circle and an inner circle, as shown in the present disclosure.

S1003, according to terminal position information of the terminal, it is determined whether the terminal is located in the outer circle of the coverage area of the base station.

S1004, if the terminal is located in the outer circle of the coverage area of the base station, it is determined that the terminal belongs to the first UE set, to enable UE-to-UE co-channel cross-link interference between adjacent cells to be avoided.

S1005, if the terminal is located in the inner circle of the coverage area of the base station, a UE set to which the terminal belongs is further determined wherein the UE set is a first UE set or a second UE set.

S1006, if the terminal belongs to the first UE set, the terminal is scheduled based on the first TDD frame structure.

S1007, if the terminal belongs to the second UE set, the terminal is scheduled based on the second TDD frame structure.

In the embodiments of the present disclosure, for "UEs after initiating initial random access", each satellite-borne base station, according to geographical position information reported by these UEs, when scheduling, enables UEs located in the outer circle of the cell to only adopt the first TDD frame structure, two frame structures are used for UEs located in the inner circle of the cell to improve a utilization rate of air interface resources. If each idle UE selects a timing sequence of the first TDD frame structure to initiate initial random access, any "UE that is initiating initial random access" at an edge of a cell does naturally not cause UE-to-UE interference to "a UE after initiating initial random access" located at an edge in an adjacent cell.

Further, a cell for which an LEO satellite is projected to the ground includes three possible modes: an ground-moving cell, an ground-fixed cell (also called a staring cell in some literatures), and a quasi-ground-fixed cell. The ground-moving cell means that a cell for which a satellite is projected to the ground moves with the satellite (in this situation, antennas of the satellite are generally perpendicular to the ground). The ground-fixed cell means that a cell for which a satellite is projected to the ground is stationary relative to the ground (the satellite, in the process of moving, needs to complete covering of a given area by adjusting pointing angle of an antenna). The quasi-ground-fixed cell means that a satellite may only perform fixed-point covering of a given area on the ground within a certain period of time (i.e. being in a state of the ground-fixed cell), but after the period of time expires, a cell for which a satellite is projected to the ground moves with the satellite (i.e., being in a state of the ground-moving cell).

When a target cell projected by the base station corresponds to an ground-moving cell mode or a quasi-ground-fixed cell mode, for each second terminal in the second UE set, if, according to its position information, it is monitored to change from being located in the inner circle of the coverage area of the base station to being located in the outer circle of the coverage area of the base station, changing the UE set to which it belongs to the first UE set.

Further, in the present disclosure, mutual coordination may further be carried out between adjacent satellite-borne base stations via an inter-satellite link. Specific implementation is as follows:

Receiving adjacent cell terminal position information transmitted by an adjacent base station, the adjacent cell terminal position information being position information corresponding to a terminal classified by the adjacent base station into the first UE set or the second UE set, or position information corresponding to a terminal classified by the adjacent base station into the first UE set or the second UE set and being in an edge beam footprint of a corresponding adjacent cell.

According to position information of a terminal classified by the base station into the first UE set or the second UE set and the adjacent cell terminal position information, determining at least one terminal equipment group for which subband-level frequency division scheduling is to be performed, the terminal equipment group including at least one terminal classified by the base station into the first or second UE set and at least one neighboring terminal classified by the adjacent base station into the first or second UE set.

A specific method for determining at least one terminal equipment group for which subband-level frequency division scheduling is to be performed is: according to position information of a terminal classified by the base station into the first UE set or the second UE set and the adjacent cell terminal position information, calculating a fourth distance between each terminal classified by the base station into the first UE set or the second UE set and each terminal classified by the adjacent base station into the first UE set or the second UE set, or calculating a fourth distance between each terminal classified by the base station into the first UE set or the second UE set and being in an edge beam footprint of a cell and each terminal classified by the adjacent base station into the first UE set or the second UE set and being in an edge beam footprint of a corresponding adjacent cell; for any terminal classified by the base station into the first UE set or the second UE set, if the fourth distance between any neighboring terminal classified by the adjacent base station into the first UE set or the second UE set and the terminal is less than the first preset distance threshold, the terminal and the neighboring terminal become members of a terminal equipment group; or, for any terminal classified by the base station into the first UE set or the second UE set and being in an edge beam footprint of the cell, if the fourth distance between any neighboring terminal classified by the adjacent base station into the first UE set or the second UE set and being in an edge beam footprint of a corresponding adjacent cell and the terminal is less than the first preset distance threshold, the terminal and the neighboring terminal become members of a terminal equipment group.

Scheduling terminals included in the terminal equipment group by cooperating with the adjacent base station and adopting a subband-level frequency division scheduling scheme.

Further, in the present disclosure, when a designed frame structure scheme is applied, an adaptive design needs to carry out for an SSB transmission scheme.

The first design scheme: a design that does not change existing 3GPP NR protocols.

All idle UEs receive CD-SSBs (which may be used to define SSBs of a cell, that is, default SSBs that may be used for cell access, English full name is cell-defining SSB) according to established SSB transmission timing before initial random access is initiated.

After a UE initiates initial random access, for any UE that is scheduled to use the second TDD frame structure, let it monitor a NCD-SSB (that is, an SSB that is not available for being used to define a cell, English full name is non-cell-defining SSB) to complete required RRM, RLM and BFD measurements.

A base station performs the same frame header offsetting for transmission of the NTD-SSB, wherein the frame header offset corresponding to the NTD-SSB is the same as the frame header offset corresponding to the second TDD frame structure, and each terminal in the second UE set receives the NTD-SSB to complete required wireless link measurement.

The period of the NCD-SSB is set to be greater than or equal to the period of the CD-SSB (this conforms to the provisions of the 3GPP NR protocol).

It should be noted that the NCD-SSB is called "an SSB that not available for being used to define a cell", the reason is that an MIB message in the NCD-SSB does not include information related to SIB1 (specifically, the MIB message in the NCD-SSB does not include CORESET #0 and Type 0-PDCCH CSS for a UE to receive/decode SIB1 messages).

The second design scheme: a design that changes existing 3GPP NR protocols.

Figure 12:
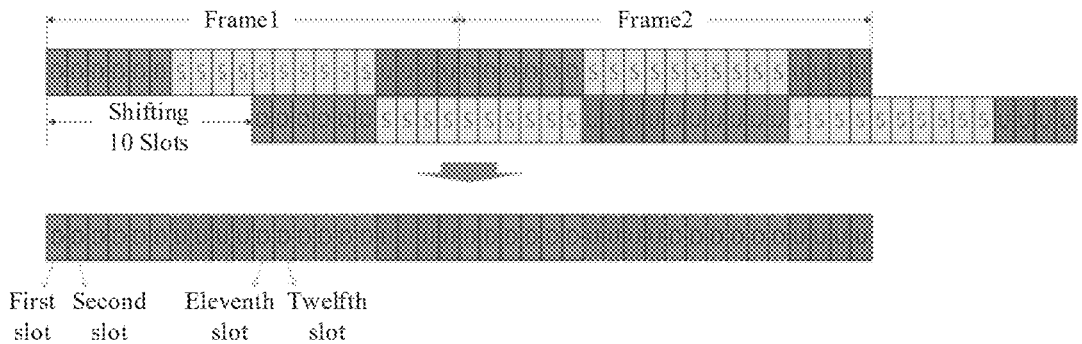
FIG. 12 is a schematic diagram of determining a transmission slot of a CD-SSB by taking a first frame structure group design scheme as an example.

In the TDD frame structure design of the present application, the offset of a frame header is the sum of the number of DL slots and the number of UL slots in the first TDD frame structure. Denoting "the sum of the number of DL slots and the number of UL slots in the first TDD frame structure" as M, a designed change may be described as follows: the frame header of the first TDD frame structure is counted as a time starting point, a satellite-borne base station transmits a CD-SSB in a first slot, a second slot, an M+1th slot, and an M+2th slot. FIG. 12 is a schematic diagram of determining a transmission slot of a CD-SSB by taking a first frame structure group design scheme as an example. "D" denotes a downlink DL slot, "S" denotes a guard period GP slot, and "U" denotes an uplink UL slot, M is equal to the number N of GP slots. Based on the specific frame structure example shown in FIG. 12 (a frame period is 10 ms, N=10), the designed change to the SSB transmission scheme is described as follows: the SSB transmission scheme named case C in the 3GPP 5G protocol serves as a design basis, the 3GPP 5G protocol stipulates that a CD-SSB is transmitted in the first four slots of every 20 ms duration (i.e., every two wireless frames). Here, in order to adapt to the proposal in the present application that "a base station uses the first TDD frame structure and the second TDD frame structure to respectively schedule some UEs in a cell", it may be changed to let a CD-SSB transmit in an M+1th slot (the 11th slot) and an M+2 slot (the 12th slot) of the first two slots in every 20 ms duration.

Further, in the present disclosure, optimization of "the reporting time of a GNSS measurement result for the first time" is also proposed. Specifically:

According to the definition of the current version of the 3GPP protocol, after the initial random access is completed, a UE communicates with a core network via an NAS message to complete identity identification, authentication and encryption; then completes safety mode authentication and GNSS measurement result query and reporting via an air interface; next, UE capability query and reporting is carried out. That is to say, an idle UE, after completing the initial random access procedures (that is, after completing the transmission of Msg5), needs to undergo some other message transmission, then reports a GNSS measurement result (that is, its own geographical position information) for the first time.

In order to achieve more effective interference avoidance effect by geographical isolation (especially when geographical isolation is used to avoid UE-to-UE interference caused by a first random access message of "a UE that is initiating initial random access" to "a UE after initiating initial random access"), in one exemplary embodiment, the first message (Msg1/MsgA) transmitted when an idle UE performs initial random access includes the terminal's GNSS measurement results (that is, "the reporting time of the GNSS measurement result for the first time" is advanced to "a transmission moment of the first message in an initial random access procedure").

In the case where the first message in the initial random access procedure is Msg1 (that is, the initial random access is 4-step random access): regarding a mode in which the GNSS measurement result, together with a PRACH preamble sequence, are carried by Msg1 and transmitted to a base station, refer to "a mode in which a PUSCH and a PRACH preamble sequence are carried by MsgA and transmitted to a base station" in 2-step random access. In other words, the GNSS measurement result, together with a PRACH preamble sequence, is carried by Msg1 and transmitted to a base station according to pre-configured time-frequency resources (i.e., unlicensed scheduling) broadcast in a system message.

In the case where the first message in the initial random access procedure is MsgA (that is, the initial random access adopts 2-step random access): add the GNSS measurement result as newly added content of a PUSCH in MsgA.

Figure 13:
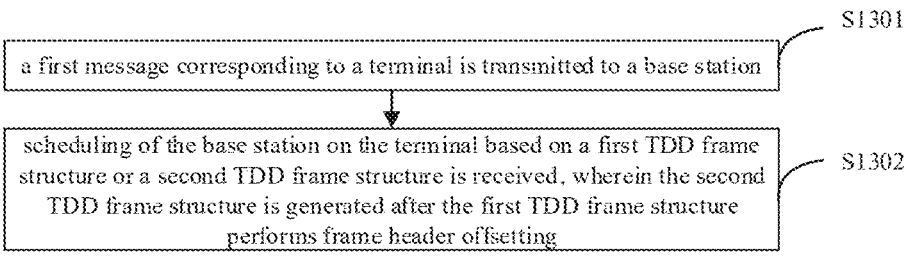
FIG. 13 is a schematic diagram of an exemplary implementation of a satellite communication method based on a time division duplex (TDD) frame structure design, as shown in the present disclosure.

FIG. 13 is a schematic diagram of an exemplary implementation of a satellite communication method based on a time division duplex (TDD) frame structure design, as shown in the present disclosure, applicable to a user equipment (UE), the communication method based on a time division duplex (TDD) frame structure design comprising the following steps:

S1301, a first message corresponding to a terminal is transmitted to a base station.

Optionally, the first message is a message reported for the first time by a terminal for a position measurement result corresponding to the terminal after completing initial random access.

Optionally, the first message is a first message transmitted by a terminal to a base station when initiating initial random access.

A user equipment (UE) transmits a first message corresponding to a terminal to a base station. Correspondingly, after receiving the first message transmitted by the terminal, the base station determines a UE set to which the terminal belongs according to a preset first criterion.

S1302, scheduling of the base station on the terminal based on a first TDD frame structure or a second TDD frame structure is received, wherein the second TDD frame structure is generated after the TDD frame structure performs frame header offsetting.

If the terminal belongs to the first UE set, receiving scheduling of the terminal by the base station based on the first TDD frame structure.

If the terminal belongs to the second UE set, receiving scheduling of the terminal by the base station based on the second TDD frame structure.

The first UE set is a set consisting of terminals that are called to use the first TDD frame structure.

The second UE set is a set consisting of terminals that are called to use the second TDD frame structure.

According to the embodiments of the present disclosure, in a cell, based on classification and scheduling of UEs by a satellite-borne base station, some ground UEs adopt the first TDD frame structure, while the TDD frame structure of other ground UEs adopt a frame header offsetting version of the first TDD frame structure, i.e., the second TDD frame structure; and all (or part) of DL and UL slots in the second TDD frame structure correspond to GP slots in the first TDD frame structure (i.e. occurring at the same time), meanwhile, all (or part) DL and UL slots in the first TDD frame structure naturally correspond to GP slots in the second TDD frame structure, thereby enabling the satellite-borne base station to communicate with some other UEs when communication with some UEs enters into a waiting period (i.e., in a GP period of a corresponding frame structure); thereby, a utilization rate of air interface resources of a whole system is improved.

Optionally, the first message is a message reported by a terminal for the first time for a corresponding position measurement result of the terminal after completing initial random access, wherein TDD frame structure configuration information carried by the base station in a broadcast first system message is configuration information corresponding to the first TDD frame structure; wherein after the base station receives a first message of all messages transmitted by the terminal before transmitting the first message, if the terminal at a current moment is not included in the first UE set or the second UE set, determining that the terminal belongs to the first UE set; wherein a moment for reporting a message reported for the first time for a position measurement result corresponding to the terminal is after the terminal completes initial random access, completes identity identification, authentication and encryption with a core network via a non-access stratum (NAS), and completes a safe mode control flow with the base station via air interface interaction.

Optionally, the first message is a first message transmitted by the terminal to the base station when initiating initial random access, wherein first reporting of the position measurement result corresponding to the terminal adopts a pre-configured time-frequency resource in a system message and is transmitted to the base station along with the first message; wherein TDD frame structure configuration information carried by the base station in a broadcast first system message is configuration information corresponding to the first TDD frame structure, and the terminal transmits the first message using a timing sequence of the first TDD frame structure.

If the first message is a first message transmitted by the terminal to the base station when initiating initial random access, and a method for determining whether the first message is transmitted and a frame structure corresponding to the first message when being transmitted includes: a first system message broadcast by a base station is received, TDD frame structure configuration information carried by the base station in a broadcast first system message is configuration information corresponding to the first TDD frame structure; a second system message broadcast by the base station is received, a second system message broadcast by the base station carries position information of a terminal that has belonged to the second UE set in a current beam footprint covered by a beam carrying the second system message, and position information of a terminal that has belonged to the second UE set and whose nearest distance from a boundary of the current beam footprint in each adjacent beam footprint is less than or equal to a first preset distance threshold; the terminal determines whether current initiation of initial random access produces UE-to-UE co-channel cross-link interference to a neighboring terminal that has belonged to the second UE set, based on the first system message and the second system message broadcast by the base station, a position measurement result of the terminal itself, and the first preset distance threshold; if a determination result is that UE-to-UE interference is not produced to a neighboring terminal in the second UE set, the terminal transmits the first message using a timing sequence of the first TDD frame structure; if a determination result is that UE-to-UE interference is produced to at least one neighboring terminal in the second UE set, the terminal does not transmit the first message temporarily; and if the first message is transmitted, first reporting of the position measurement result corresponding to the terminal adopts a pre-configured time-frequency resource in a system message and is transmitted to the base station along with the first message.

If the first message is a first message transmitted by the terminal to the base station when initiating initial random access, and a method for determining whether the first message is transmitted and a frame structure corresponding to the first message when being transmitted includes: a first system message broadcast by a base station is received, TDD frame structure configuration information carried by a first system message broadcast by the base station includes configuration information corresponding to the first TDD frame structure and configuration information of frame header offsetting required to generate the second TDD frame structure; a second system message broadcast by the base station is received, a second system message broadcast by the base station carries position information of a terminal that has belonged to the first UE set and the second UE set in a current beam footprint covered by a beam carrying the second system message, and position information of a terminal that has belonged to the first UE set and the second UE set and whose nearest distance from a boundary of the current beam footprint in each adjacent beam footprint is less than or equal to a first preset distance threshold; the terminal determines whether current initiation of initial random access produces UE-to-UE co-channel cross-link interference to a neighboring terminal that has belonged to the first UE set or the second UE set, based on the first system message and the second system message broadcast by the base station, a position measurement result of the terminal itself, and the first preset distance threshold; if a determination result is that UE-to-UE interference is not produced to neighboring terminals in the first UE set and the second UE set, the terminal transmits the first message using a timing sequence of the first TDD frame structure or the second TDD frame structure; if a determination result is that UE-to-UE interference is produced to a neighboring terminal in the first UE set but is not produced to a neighboring terminal in the second UE set, the terminal transmits the first message using a timing sequence of the first TDD frame structure; if a determination result is that UE-to-UE interference is produced to a neighboring terminal in the second UE set but is not produced to a neighboring terminal in the first UE set, the terminal transmits the first message using a timing sequence of the second TDD frame structure; if a determination result is that UE-to-UE interference is produced to at least one neighboring terminal in the first UE set and at least one neighboring terminal in the second UE set, the terminal does not transmit the first message temporarily; and if the first message is transmitted, first reporting of the position measurement result corresponding to the terminal adopts a pre-configured time-frequency resource in a system message and is transmitted to the base station along with the first message.

Further, after the base station adopts a subband-level frequency division scheduling scheme for some terminals that use different frame structures, to avoid possible UE-to-UE co-channel cross-link interference, if co-channel cross-link interference indeed occurs between said terminals, for UE-to-UE co-channel inter-subband cross-link interference that is residual at a terminal side after the subband-level frequency division scheduling is adopted, interference elimination is performed based on one or more schemes of an interference elimination scheme in a spatial domain, an interference elimination scheme in an analog domain and an interference elimination scheme in a digital domain.

Figure 14:
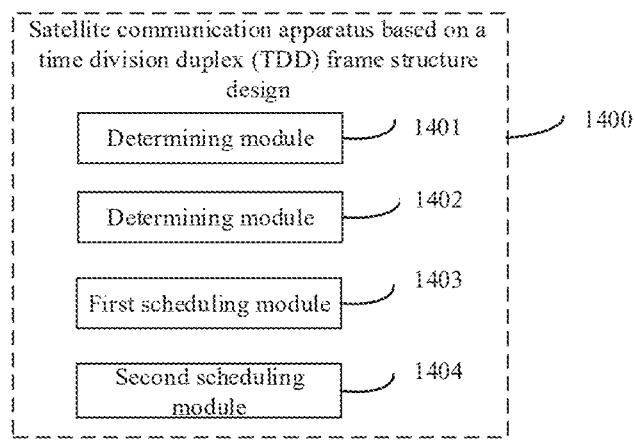
FIG. 14 is a structural schematic diagram of a satellite communication apparatus based on a time division duplex (TDD) frame structure design, as provided in the embodiments of the present disclosure.

FIG. 14 is a structural schematic diagram of a satellite communication apparatus based on a time division duplex (TDD) frame structure design, as provided in the embodiments of the present disclosure.

As shown in FIG. 14, a satellite communication apparatus 1400 based on a time division duplex (TDD) frame structure design, applicable to a network device, includes: a determining module 1401, a determining module 1402, a first scheduling module 1403 and a second scheduling module 1404.

The determining module 1401 is configured to determine a preset time division duplex (TDD) frame structure group corresponding to a base station, wherein the preset TDD frame structure group includes a first TDD frame structure and a second TDD frame structure generated after frame header offsetting is performed on the first TDD frame structure.

The determining module 1402 is configured to, in response to receiving a first message transmitted by a terminal, determine a UE set to which the terminal belongs, wherein the UE set is a first UE set or a second UE set.

The first scheduling module 1403 is configured to, if the terminal belongs to the first UE set, schedule the terminal based on the first TDD frame structure.

The second scheduling module 1404 is configured to, if the terminal belongs to the second UE set, schedule the terminal based on the second TDD frame structure.

Figure 15:
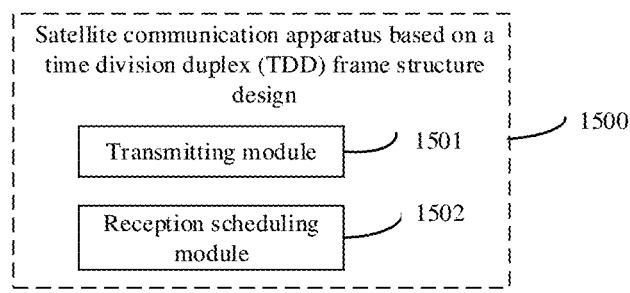
FIG. 15 is a structural schematic diagram of another satellite communication apparatus based on a time division duplex (TDD) frame structure design, as provided in the embodiments of the present disclosure.

FIG. 15 is a structural schematic diagram of another satellite communication apparatus based on a time division duplex (TDD) frame structure design, as provided in the embodiments of the present disclosure.

As shown in FIG. 15, a satellite communication apparatus 1500 based on a time division duplex (TDD) frame structure design, applicable to a user equipment (UE), includes: a transmitting module 1501 and a reception scheduling module 1502.

The transmitting module 1501 is configured to transmit a first message corresponding to a terminal to a base station.

The reception scheduling module 1502 is configured to receive scheduling of the base station on the terminal based on a first TDD frame structure or a second TDD frame structure, wherein the second TDD frame structure is generated after the TDD frame structure performs frame header offsetting.

According to the embodiments of the present disclosure, the present disclosure further provides a communication device and a readable storage medium.

Figure 16:
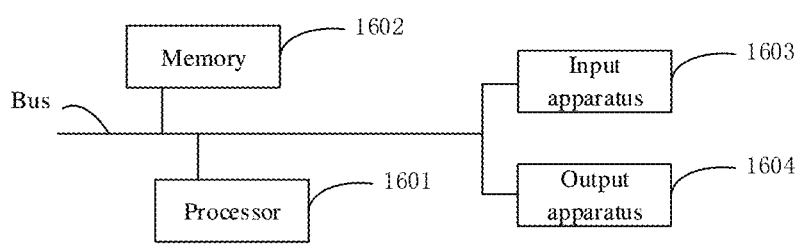
FIG. 16 is a schematic diagram of a communication device, as provided by the embodiments of the present disclosure.

As shown in FIG. 16, a communication device includes one or more processors 1601, a memory 1602, and interfaces for connecting components, including a high-speed interface and a low-speed interface. The components are connected to each other using different buses, and may be installed on a common mainboard or installed by other means as required. A processor may process instructions executed within the communication device, including instructions stored in or on the memory to display graphical information of a GUI on an external input/output device (such as a display device coupled to an interface). In other implementations, if needed, a plurality of processors and/or multiple buses may be used together with a plurality of memories. Similarly, a plurality of communication devices may be connected, each providing some of necessary operations (for example, as an array of servers, a group of blade servers, or a multiprocessor system). In FIG. 16, a processor 1601 is taken as an example.

Memory 1602 is the non-instantaneous computer readable storage medium provided in the present disclosure. The memory stores instructions that may be executed by at least one processor to enable the at least one processor to execute a satellite communication method based on a time division duplex (TDD) frame structure design provided in the present disclosure. The non-instantaneous computer-readable storage medium in the present disclosure stores computer instructions for enabling a computer to execute a satellite communication method based on a time division duplex (TDD) frame structure design provided in the present disclosure.

Memory 1602, as a non-instantaneous computer readable storage medium, may be used to store non-instantaneous software programs, non-instantaneous computer executable programs and modules, such as program instructions/modules corresponding to a satellite communication method based on a time division duplex (TDD) frame structure in the embodiments of the present disclosure. Processor 1601 executes various functional applications and data processing of a server by running non-instantaneous software programs, instructions and modules stored in the memory 1602, that is, implements a satellite communication method based on a time division duplex (TDD) frame structure in the above method embodiments.

Memory 1602 may include a storage program area and a storage data area, wherein the storage program area may store an operating system, and application programs required by at least one function; the storage data area may store data created according to use of a positioning communication device. In addition, the memory 1602 may include a high-speed random access memory and may further include a non-instantaneous memory, such as at least one disk storage device, a flash memory device, or other non-instantaneous solid-state storage device. Optionally, the memory 1200 optionally includes memories that are remotely set relative to the processor 1601, these remote memories may be connected to a positioning communication device via a network. Instances of such network include but are not limited to the Internet, corporate intranets, local area networks, mobile communication networks and their combinations.

The communication device may further include an input apparatus 1603 and an output apparatus 1604. Processor 1601, the memory 1602, the input apparatus 1603 and the output apparatus 1604 may be connected via a bus or other means. In FIG. 16, connecting via a bus is taken as an example.

The input apparatus 1603 may receive input numeric or character information and generate key signal inputs related to user settings and functional control of a positioning communication device, such as a touch screen, a keyboard, a mouse, a trackpad, a touchpad, an indication rod, one or more mouse buttons, a trackball, a joystick and other input apparatus. The output apparatus 1604 may include a display device, an auxiliary lighting apparatus (e.g., LED) and a tactile feedback apparatus (e.g., a vibrating motor), etc. The display device may include but is not limited to a liquid crystal display (LCD), a light emitting diode (LED) display, and a plasma display. In some implementations, the display device may be a touch screen.

Various implementations of the systems and technologies described herein may be implemented in digital electronic circuit systems, integrated circuit systems, dedicated ASICs (application-specific integrated circuits), computer hardware, firmware, software, and/or their combinations. These various implementations may include: implementations in one or more computer programs, the one or more computer programs may be executed and/or interpreted on a programmable system including at least one programmable processor, the programmable processor may be a dedicated or general-purpose programmable processor, may receive data and instructions from a storage system, at least one input apparatus and at least one output apparatus, and transmit data and instructions to the storage system, the at least one input apparatus and the at least one output apparatus.

These computing programs (also called programs, software, software applications, or codes) include machine instructions of programmable processors and may be implemented using advanced procedures and/or object-oriented programming languages, and/or assembly/machine languages. As used herein, the terms "machine readable medium" and "computer readable medium" refer to any computer program product, device and/or apparatus (e.g., disk, optical disc, memory, programmable logic device (PLD)) used to provide machine instructions and/or data to a programmable processor, including a machine readable medium that receives machine instructions as machine readable signals. Term "machine readable signal" refers to any signal used to provide machine instructions and/or data to a programmable processor.

In order to provide interaction with a user, the systems and technologies described herein may be implemented on a computer having: a display apparatus (e.g., CRT (cathode ray tube) or LCD (liquid crystal display) monitor) for displaying information to the user; and a keyboard and a pointing apparatus (e.g., a mouse or a trackball), through which the user may provide inputs to a computer. Other types of apparatuses may further be used to provide interaction with a user; for example, feedback provided to the user may be any form of sensory feedback (such as visual feedback, auditory feedback, or tactile feedback); and input from the user may be received in any form (including acoustic input, voice input, or tactile input).

Systems and technologies described herein may be implemented in a computing system (for example, as a data server) that includes backend components, or a computing system (for example, an application server) that includes middleware components, or a computing system (for example, a user computer with a graphical user interface or a web browser, a user may interact with implementations of the systems and technologies described here via the graphical user interface or the web browser) that includes frontend components, or in a computing system that includes any combination of such backend components, middleware components or frontend components. Components of a system may be connected to each other through digital data communication in any form or medium (such as a communication network). Examples of the communication network include a local area network (LAN), a wide area network (WAN), and the Internet.

A computer system may include a client and a server. The client and the server are generally far away from each other and usually interact via a communication network. A client-server relationship is generated by computer programs that run on a corresponding computer and have a client-server relationship with each other.

It should be understood that steps may be reordered, added or deleted using various forms of processes shown above. For example, steps recorded in the present disclosure may be performed in parallel, may be performed sequentially or may be performed in a different order, as long as the desired results of the technical solution disclosed in the present disclosure may be achieved, they are not limited herein.

The invention claimed is:

1. A satellite communication method based on a time division duplex (TDD) frame structure design, applicable to a network device, characterized by comprising:
   determining a preset time division duplex (TDD) frame structure group corresponding to a base station, wherein the preset TDD frame structure group includes a first TDD frame structure and a second TDD frame structure generated by performing frame header offsetting on the first TDD frame structure;
   in response to receiving a first message transmitted by a terminal, determining a UE set to which the terminal belongs, wherein the UE set is a first UE set or a second UE set;
   if the terminal belongs to the first UE set, scheduling the terminal based on the first TDD frame structure; and
   if the terminal belongs to the second UE set, scheduling the terminal based on the second TDD frame structure.

2. The method of claim 1, further comprises:
   setting the first TDD frame structure, wherein a number of guard period (GP) slots of the first TDD frame structure is N, and the sum of a number of downlink (DL) slots and a number of uplink (UL) slots of the first TDD frame structure is equal to N;
   offsetting a frame header of the first TDD frame structure by N slots to obtain the second TDD frame structure, wherein all DL slots and all UL slots in the second TDD frame structure correspond to all GP slots in the first TDD frame structure; and
   generating the preset TDD frame structure group based on the first TDD frame structure and the second TDD frame structure.

3. The method of claim 1, further comprises:
   setting the first TDD frame structure, wherein a number of GP slots of the first TDD frame structure is N, and the sum of a number of DL slots and a number of UL slots of the first TDD frame structure is less than N;
   performing frame header offsetting on the first TDD frame structure to obtain the second TDD frame structure, wherein all DL slots and all UL slots in the second TDD frame structure correspond to part of the GP slots in the first TDD frame structure; and
   generating the preset TDD frame structure group based on the first TDD frame structure and the second TDD frame structure.

4. The method of claim 1, further comprises:
   setting the first TDD frame structure, wherein a number of GP slots of the first TDD frame structure is N, and the sum of a number of DL slots and a number of UL slots of the first TDD frame structure is greater than N;
   performing frame header offsetting on the first TDD frame structure to obtain the second TDD frame structure, wherein part of all DL slots and all UL slots in the second TDD frame structure correspond to all GP slots in the first TDD frame structure, a conflicting slot exists between the first TDD frame structure and the second TDD frame structure; and
   generating the preset TDD frame structure group based on the first TDD frame structure and the second TDD frame structure.

5. The method of claim 4, further comprises:
   setting the conflicting slot located on the first TDD frame structure to be silent; or,
   setting the conflicting slot located on the second TDD frame structure to be silent.

6. The method of claim 4, further comprises:
   when the conflicting slot is scheduled by a base station, performing, by using a subband full duplex technology, frequency division multiplexing taking subband as granularity on reception of uplink data of a first terminal and transmission of downlink data to a second terminal, wherein the first terminal is scheduled by the base station to use one frame structure of the first and second TDD frame structures to transmit uplink data and the second terminal is scheduled by the base station to use the other frame structure of the first and second TDD frame structures to receive downlink data.

7. The method of claim 6, characterized in that after the frequency division multiplexing is performed on reception of uplink data of the first terminal and transmission of downlink data of the second terminal, the frequency division multiplexing using the subband full duplex technology and taking subband as granularity, the first terminal being scheduled by the base station to use one frame structure of the first and second TDD frame structures to transmit uplink data and the second terminal is scheduled by the base station to use the other frame structure of the first and second TDD frame structures to receive downlink data, further comprises:
  based on one or more schemes of an interference elimination scheme in a spatial domain, an interference elimination scheme in an analog domain and an interference elimination scheme in a digital domain, performing interference elimination on two intersubband interferences residual on a network side, the two intersubband interferences including base station's self interference and co-channel inter-subband cross-link interference between base stations.

8. The method of claim 1, further comprises:
  when UE-to-UE co-channel cross-link interference exists between any first terminal belonging to the first UE set and any second terminal belonging to the second UE set, adopting a subband-level frequency division scheduling scheme to avoid interference.

9. The method of claim 1, characterized in that in response to receiving the first message transmitted by the terminal, determining the UE set to which the terminal belongs comprises:
  obtaining a first position information set corresponding to each first terminal in the first UE set, wherein the first terminal and the base station are in a connected state;
  obtaining a second position information set corresponding to each second terminal in the second UE set, wherein the second terminal and the base station are in a connected state;
  obtaining terminal position information corresponding to the terminal; and
  determining a UE set to which the terminal belongs, according to the first position information set, the second position information set and the terminal position information.

10. The method of claim 9, characterized in that determining the UE set to which the terminal belongs, according to the first position information set, the second position information set and the terminal position information, further comprises:
  determining a first distance by obtaining a minimum distance in distances between the terminal and each first terminal in the first UE set according to the first position information set and the terminal position information;
  determining a second distance by obtaining a minimum distance in distances between the terminal and each second terminal in the second UE set according to the second position information set and the terminal position information; and
  comparing the first distance and the second distance with a first preset distance threshold to determine a UE set to which the terminal belongs.

11. The method of claim 10, characterized in that comparing the first distance and the second distance with the first preset distance threshold to determine the UE set to which the terminal belongs further comprises:
  if both the first distance and the second distance are greater than or equal to the first preset distance threshold, determining that the terminal belongs to the first UE set or determining that the terminal belongs to the second UE set;
  if the first distance is greater than or equal to the first preset distance threshold and the second distance is less than the first preset distance threshold, determining that the terminal belongs to the first UE set;
  if the first distance is less than the first preset distance threshold and the second distance is greater than or equal to the first preset distance threshold, determining that the terminal belongs to the second UE set; and
  if both the first distance and the second distance are less than the first preset distance threshold, determining a UE set to which the terminal belongs based on a preset UE set determination criterion.

12. The method of claim 11, characterized in that determining the UE set to which the terminal belongs based on the preset UE set determination criterion includes but is not limited to:
  determining a UE set to which the terminal belongs based on terminal quantity balance criteria within the first UE set and the second UE set; or,
  determining a UE set to which the terminal belongs based on one of randomly selected criteria.

13. The method of claim 12, characterized in that if both the first distance and the second distance are less than the first preset distance threshold, after determining the UE set to which the terminal belongs based on the preset UE set determination criterion, further comprising:
  if the UE set to which the terminal belongs is the second UE set, according to the first position information set and the terminal position information, obtaining a first terminal subset in the first UE set, and adopting a subband-level frequency division scheduling scheme to avoid co-channel cross-link interference between the terminal and each terminal in the first terminal subset, wherein distance value of each terminal in the first terminal subset from the terminal is less than the first preset distance threshold; and
  if the UE set to which the terminal belongs is the first UE set, according to the second position information set and the terminal position information, obtaining a second terminal subset in the second UE set, and adopting a subband-level frequency division scheduling scheme to avoid co-channel cross-link interference between the terminal and each terminal in the second terminal subset, wherein distance value of each terminal in the second terminal subset from the terminal is less than the first preset distance threshold.

14. The method of claim 13, further comprises:
  in response to receiving position update information reported by any of the first terminals in the first UE set or any of the second terminals in the second UE set, according to the position update information, redetermining a UE set corresponding to the terminal reporting the position update information.

15. The method of claim 14, further comprises:
  when redetermining a UE set corresponding to the terminal reporting the position update information according to the position update information, changing a UE set to which at least one terminal that does not report the position update information in the first UE set and the second UE set belongs, to enable the number of terminals that need to adopt a subband-level frequency division scheduling scheme to avoid interterminal co-channel cross-link interference, in the updated first and second UE sets, to be minimized.

16. The method of claim 1, characterized in that in response to receiving the first message transmitted by the terminal, determining the UE set to which the terminal belongs comprises:
  according to a boundary of a coverage area of the base station and a first preset distance threshold, dividing the coverage area of the base station into an outer circle and an inner circle, wherein a minimum distance between a demarcation line of the outer circle and the inner circle and the boundary of the coverage area of the base station is at least greater than or equal to the first preset distance threshold;

according to terminal position information of the terminal, determining whether the terminal is located in the outer circle of the coverage area of the base station;

if the terminal is located in the outer circle of the coverage area of the base station, determining that the terminal belongs to the first UE set, to enable interterminal co-channel cross-link interference between adjacent cells to be avoided; and if the terminal is located in the inner circle of the coverage area of the base station, determining a UE set to which the terminal belongs according to the method described in claim 1, wherein the UE set is the first UE set or the second UE set.

17. The method of claim 16, further comprises:

when a target cell projected by the base station corresponds to an ground-moving cell mode or a quasi-ground-fixed cell mode, for each second terminal in the second UE set, if, according to its position information, it is monitored to change from being located in the inner circle of the coverage area of the base station to being located in the outer circle of the coverage area of the base station, changing the UE set to which it belongs to the first UE set.

18. The method of claim 1, further comprises:

performing frame header offset on a synchronization and broadcast signal block (NCD-SSB) that is not available for being used to define a cell, wherein a frame header offset corresponding to the NCD-SSB is the same as a frame header offset corresponding to the second TDD frame structure, and each terminal in the second UE set receives the NCD-SSB to complete required wireless link measurements.

19. The method of claim 1, characterized in that in response to receiving the first message transmitted by the terminal, determining the UE set to which the terminal belongs comprises:

in response to receiving the first message transmitted by the terminal, determining the UE set to which the terminal belongs according to a preset UE set determination criterion.

20. The method of claim 1, characterized in that the first message is a message reported for the first time by the terminal for a position measurement result corresponding to the terminal after completing initial random access, and the method further comprises:

TDD frame structure configuration information in a first system message broadcasted by the base station is configuration information corresponding to the first TDD frame structure, and after the base station receives a first message of all messages transmitted by the terminal before the terminal transmitting the first message, if the terminal at a current moment is not included in the first UE set or the second UE set, determining that the terminal belongs to the first UE set, wherein a moment for reporting the message reported for the first time for the position measurement result corresponding to the terminal is after the terminal completes initial random access, completes identity identification, authentication and encryption with a core network via a non-access stratum (NAS), and completes a safe mode control flow with the base station via air interface interaction.

21. The method of claim 1, characterized in that the first message is a first message transmitted by the terminal to the base station when initiating initial random access, and further comprises:

first time reporting of a position measurement result corresponding to the terminal is transmitted by the terminal to the base station along with the first message by adopting a pre-configured time-frequency resource in a system message;

TDD frame structure configuration information in a first system message broadcasted by the base station being configuration information corresponding to the first TDD frame structure, and the first message transmitted by the terminal using a timing sequence of the first TDD frame structure.

22. The method of claim 20, further comprises:

when the base station performs downlink time-frequency resource scheduling for any terminal belonging to the second UE set, determining a slot index of an UL slot configured to transmit a random access preamble sequence, in the first TDD frame structure;

obtaining slot indexes of multiple consecutive DL slots in the second TDD frame structure, wherein distance from the multiple consecutive DL slots in the second TDD frame structure to the UL slot configured to transmit a random access preamble sequence in the first TDD frame structure is in a preset slot range; and when performing frequency-domain resource scheduling on each DL slot of the multiple consecutive DL slots in the preset slot range in the second TDD frame structure, performing subband-level frequency division scheduling on air interface resources configured for terminals in the first UE set to perform initial random access.

23. A satellite communication method based on a time division duplex (TDD) frame structure design, applicable to a user equipment (UE), comprising:

transmitting a first message corresponding to the UE to a base station; and receiving scheduling information by the base station to the UE based on a first TDD frame structure or a second TDD frame structure, wherein the second TDD frame structure is generated after the TDD frame structure performs frame header offsetting.

24. The method of claim 23, characterized in that the first message is the first message transmitted by the UE to the base station when initiating initial random access, wherein first reporting of a position measurement result corresponding to the UE uses a pre-configured time-frequency resource in a system message and is transmitted to the base station along with the first message; and TDD frame structure configuration information in a first system message broadcasted by the base station is configuration information corresponding to the first TDD frame structure, and the UE transmits the first message using a timing sequence of the first TDD frame structure.

25. A satellite communication apparatus based on a time division duplex (TDD) frame structure design, characterized by being applicable to a network device, the apparatus comprising a processor, wherein the processor is configured to execute the following instructions:

determining a preset time division duplex (TDD) frame structure group corresponding to a base station, wherein the preset TDD frame structure group includes a first TDD frame structure and a second TDD frame structure generated by performing frame header offsetting on the first TDD frame structure;

in response to receiving a first message transmitted by a UE, determining a UE set to which the UE belongs, wherein the UE set is a first UE set or a second UE set;

if the UE belongs to the first UE set, scheduling the UE based on the first TDD frame structure; and if the UE belongs to the second UE set, scheduling the UE based on the second TDD frame structure.

26. A satellite communication apparatus based on a time division duplex (TDD) frame structure design, characterized by being applicable to a user equipment (UE), the apparatus comprising a processor, wherein the processor is configured to execute the following instructions:

transmitting a first message corresponding to a UE to a base station; and receiving scheduling information by the base station to the UE based on a first TDD frame structure or a second TDD frame structure, wherein the second TDD frame structure is generated after the TDD frame structure performs frame header offsetting.

* * * * *